US009158039B2

(12) United States Patent
Okuno et al.

(10) Patent No.: US 9,158,039 B2
(45) Date of Patent: Oct. 13, 2015

(54) OPTICAL ELEMENT, AND OPTICAL SYSTEM AND OPTICAL APPARATUS USING SAME

(75) Inventors: Takeharu Okuno, Utsunomiya (JP); Rie Ishimatsu, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 495 days.

(21) Appl. No.: 13/552,830

(22) Filed: Jul. 19, 2012

(65) Prior Publication Data
US 2013/0027779 A1 Jan. 31, 2013

(30) Foreign Application Priority Data

Jul. 26, 2011 (JP) .................................. 2011-163287
May 30, 2012 (JP) .................................. 2012-122939

(51) Int. Cl.
*G02B 1/118* (2015.01)
(52) U.S. Cl.
CPC ....................................... *G02B 1/118* (2013.01)
(58) Field of Classification Search
CPC .......... G02B 1/11; G02B 1/111; G02B 1/113; G02B 1/115; G02B 1/118
USPC .................. 359/577, 580, 581, 586
See application file for complete search history.

(56) References Cited

U.S. PATENT DOCUMENTS

| 8,163,333 | B2 | 4/2012 | Nakayama et al. |
| 8,373,930 | B2 | 2/2013 | Sano |
| 2005/0225878 | A1 | 10/2005 | Tanaka et al. |
| 2007/0284991 | A1* | 12/2007 | Egi et al. ........................ 313/479 |
| 2009/0081361 | A1* | 3/2009 | Yamada et al. ................. 427/162 |
| 2010/0208353 | A1* | 8/2010 | Okuno ........................... 359/601 |
| 2010/0247758 | A1 | 9/2010 | Nakayama et al. |
| 2010/0296168 | A1* | 11/2010 | Sano .............................. 359/586 |
| 2012/0212827 | A1 | 8/2012 | Kakegawa |

FOREIGN PATENT DOCUMENTS

| CN | 101661118 A | 3/2010 |
| JP | 07150356 A | 6/1995 |
| JP | 2008233880 A | 10/2008 |
| JP | 44333990 B | 3/2010 |
| JP | 2011090225 A | 5/2011 |
| WO | 2011/048794 A2 | 4/2011 |

OTHER PUBLICATIONS

Chinese Office Action issued in corresponding Chinese Patent Application No. 201210255977.9 dated Apr. 2, 2014. English translation provided.
Office Action issued in JP2012-122939, mailed Aug. 4, 2015. English translation provided.

* cited by examiner

*Primary Examiner* — Stephone B Allen
*Assistant Examiner* — Kimberly N Kakalec
(74) *Attorney, Agent, or Firm* — Rossi, Kimms & McDowell LLP

(57) ABSTRACT

The optical element of the present invention has an anti-reflection film formed on a substrate. Here, the anti-reflection film comprises a first layer formed on the substrate; a second layer formed on the first layer and consisting of a material different from that of the first layer; and a third layer formed on the second layer and consisting of a concave-convex structure. Also, the third layer has three regions of which a refractive index for each thickness changes at a constant rate by continuously changing the space filling factor of the concave-convex structure.

7 Claims, 15 Drawing Sheets

FIG. 15

| Embodiments comparative examples | Refractive index of substrate | First layer Refractive index | First layer Thickness (nm) | Second layer Refractive index | Second layer Thickness (nm) | Total thickness (nm) | Third layer First region Rate of change in refractive index ($nm^{-1}$) | Third layer First region Thickness (nm) | Third layer Second region Rate of change in refractive index ($nm^{-1}$) | Third layer Second region Thickness (nm) | Third layer Third region Rate of change in refractive index ($nm^{-1}$) | Third layer Third region Thickness (nm) | Corresponding figures Refractive index structure | Corresponding figures Reflectance characteristics |
|---|---|---|---|---|---|---|---|---|---|---|---|---|---|---|
| First embodiment | 1.808 | 1.620 | 35.0 | 1.52 | 38.0 | 240.0 | 8.5 | 20 | 2.93 | 58 | 1.11 | 162 | FIG.3A | FIG.3B |
| First embodiment (Thickness −10%) | | | 31.5 | | 34.2 | 214.2 | 9.44 | 18 | 3.26 | 52.2 | 1.25 | 144 | — | FIG.4A |
| First embodiment (Thickness +10%) | | | 38.5 | | 41.8 | 261.8 | 7.73 | 22 | 2.66 | 63.8 | 1.02 | 176 | — | FIG.4B |
| Second embodiment | 1.888 | 1.695 | 50.0 | 1.58 | 20.0 | 232.0 | 6.57 | 35 | 1.94 | 72 | 1.68 | 125 | FIG.5A | FIG.5B |
| Third embodiment | 1.934 | 1.700 | 30.0 | 1.55 | 45.0 | 235.0 | 11.76 | 17 | 2.92 | 48 | 1.24 | 170 | FIG.6A | FIG.6B |
| Fourth embodiment | 1.716 | 1.560 | 50.0 | 1.51 | 18.0 | 230.0 | 4.52 | 42 | 4.29 | 28 | 1.25 | 160 | FIG.7A | FIG.7B |
| Fifth embodiment | 1.658 | 1.520 | 62.0 | 1.46 | 10.0 | 240.0 | 7.78 | 18 | 2.33 | 60 | 1.11 | 162 | FIG.8A | FIG.8B |
| Sixth embodiment | 2.011 | 1.750 | 55.0 | 1.54 | 18.0 | 256.0 | 5.28 | 36 | 2.83 | 60 | 1.13 | 160 | FIG.9A | FIG.9B |
| Seventh embodiment | 2.170 | 1.810 | 50.0 | 1.56 | 16.0 | 240.0 | 4.5 | 40 | 3.64 | 55 | 1.24 | 145 | FIG.10A | FIG.10B |
| Second comparative example | 1.808 | 1.620 | 28.0 | 1.52 | 30.0 | 190.0 | 14.17 | 12 | 5.67 | 30 | 1.22 | 148 | FIG.13A | FIG.13B |
| Third comparative example | 1.808 | 1.620 | 35.0 | 1.52 | 48.0 | 320.0 | 3.78 | 45 | 2.27 | 75 | 0.90 | 200 | FIG.14A | FIG.14B |

OPTICAL ELEMENT, AND OPTICAL SYSTEM AND OPTICAL APPARATUS USING SAME

BACKGROUND OF THE INVENTION

1. Field of the Invention

The present invention relates to an optical element including an anti-reflection film, and an optical system and an optical apparatus using the same.

2. Description of the Related Art

Conventionally, an anti-reflection film for preventing the loss of the light intensity of incident light has been coated on the surface of the optical element employed in the imaging optical system provided in a photographing lens for use in an optical apparatus such as a video camera, a photographic camera, a television camera, or the like. For example, a dielectric multilayer film (typically called "multi-coating") is widely employed as an anti-reflection film for an optical element for visible light. The dielectric multilayer film is formed of thin films, each having a different refractive index and an appropriate thickness, stacked together, whereby the amplitudes and the phases of reflected waves generated on the surfaces and the interfaces of the films are adjusted and made to interfere with each other so as to reduce reflected light. The anti-reflection film formed of the dielectric multilayer film exhibits excellent anti-reflection performance with respect to a light beam having a specific wavelength or at a specific incident angle. However, since the interference condition is not met for other light beams, it is difficult for the anti-reflection film to realize high anti-reflection performance across a wide wavelength band or a large incident angle range.

On the other hand, in a recent digital camera, an image sensor such as a CCD or a CMOS having a reflectance higher than that of a silver salt film has been used. Thus, a specific ghost called a "digital ghost" caused by the light, which has been reflected from the sensor surface of the image sensor, reaching the sensor surface again after being reflected from a lens (optical element) surface may readily occur. Also, as a lens employed in the digital camera, an abnormal dispersion glass, an aspherical lens, a lens having a large curvature, or the like may be often used in order to simultaneously achieve high quality images or high specification (zoom magnification or brightness) and portability (size reduction or weight reduction). In particular, in a lens having a large curvature, a light beam is incident at a large angle to the peripheral part of the lens. Therefore, the conventional anti-reflection film formed of the dielectric multilayer film as described above cannot prevent the reflection of light, resulting in the occurrence of unnecessary light, such as flare or ghost, which may adversely affect the resultant quality of photographed images.

Therefore, there has been a demand for an anti-reflection film which is excellent in wavelength band characteristics and incident angle characteristics, and Japanese Patent No. 4433390 discloses an anti-reflection film in which a magnesium fluoride layer is formed by a sol-gel method on a three-layered dielectric thin film formed by a vacuum deposition method and an optical element having the anti-reflection film.

Here, in the vacuum deposition method disclosed in Japanese Patent No. 4433390, an anti-reflection film is formed by a deposition material that is ejected from a deposition source and is deposited on a lens. In this case, assume that the film thickness at a position perpendicular to the deposition source is defined as 1, the film thickness at a position inclined at an angle of θ is theoretically cos θ. In other words, when a film is deposited on a lens having a large curvature using a vacuum deposition method, the thickness at the peripheral part of the lens is thinner compared with that at the central part thereof. Thus, if an anti-reflection film is formed by applying the film forming method disclosed in Japanese Patent No. 4433390 to a lens having a large curvature, the thickness at the peripheral part of each of the first layer to the third layer disclosed in Japanese Patent No. 4433390 becomes thin, and thus, the interference condition is not met, resulting in a high probability of adversely affecting anti-reflection performance.

In contrast, for example, it is also contemplated that the thickness at each of the central part and the peripheral part of a lens may be made uniform by employing a method in which a shielding having an appropriate opening is provided between a deposition source and a lens, and a deposition material is deposited through the shielding onto the lens while rotating it. However, if such a method is employed, the deposition material to be deposited onto the lens may adhere to the shielding, resulting in a reduction in the film-forming efficiency. In addition, the number of lenses housed within a deposition apparatus is reduced so as to ensure a space for installing a rotation mechanism, resulting in a reduction in productivity.

SUMMARY OF THE INVENTION

The present invention has been made under these circumstances and provides an optical element having an anti-reflection film which is advantageous not only for productivity but also for wavelength band characteristics and incident angle characteristics.

According to an aspect of the present invention, an optical element having an anti-reflection film formed on a substrate is provided wherein the anti-reflection film includes a first layer formed on the substrate; a second layer formed on the first layer and consisting of a material different from that of the first layer; and a third layer formed on the second layer and consisting of a concave-convex structure, and wherein the third layer has three regions of which a refractive index for each thickness changes at a constant rate by continuously changing the space filling factor of the concave-convex structure.

According to the present invention, an optical element having an anti-reflection film which is advantageous not only for productivity but also for wavelength band characteristics and incident angle characteristics may be provided.

Further features of the present invention will become apparent from the following description of exemplary embodiments with reference to the attached drawings.

BRIEF DESCRIPTION OF THE DRAWINGS

FIG. 15 is a table illustrating various numerical values relating to embodiments and comparative examples.

DESCRIPTION OF THE EMBODIMENTS

Hereinafter, preferred embodiments of the present invention will be described with reference to the drawings.

First Embodiment

Figure 1:
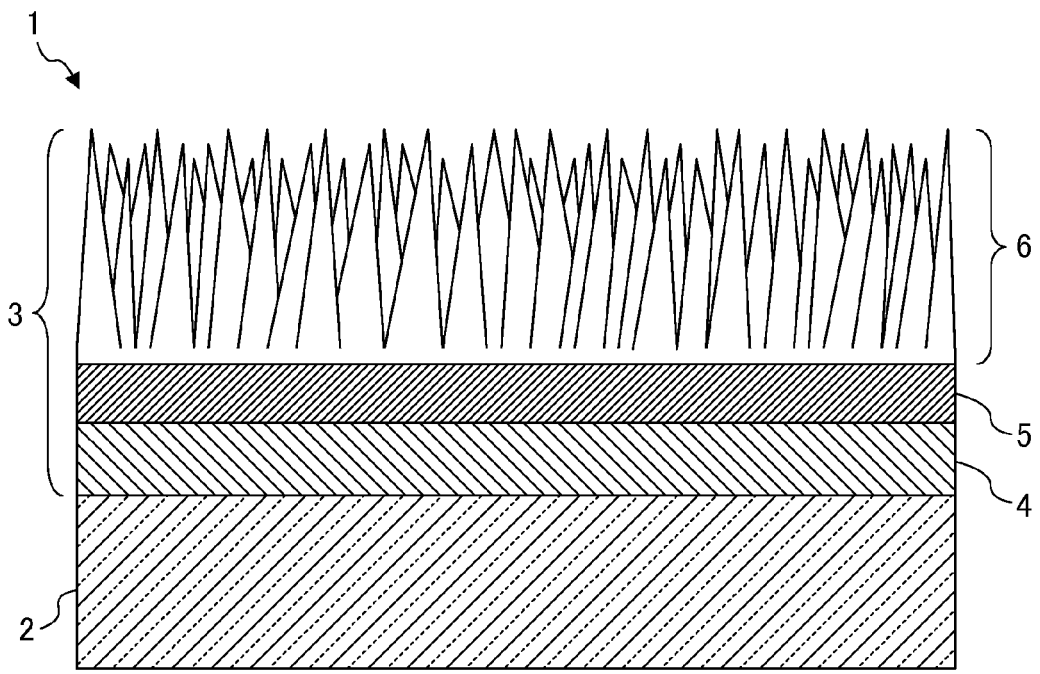
FIG. 1 is a cross sectional view illustrating the configuration of an optical element according to one embodiment of the present invention.

Firstly, a description will be given of an optical element according to one embodiment of the present invention. FIG. 1 is a schematic cross-sectional view illustrating the configuration of an optical element 1 according to the present embodiment. FIG. 1 shows the enlarged surface portion of the optical element 1. The optical element 1 includes a light-transmitting substrate 2 and three layers, i.e., a first layer 4, a second layer 5, and a third layer 6, which are formed on the surface of the substrate 2 (on the substrate) and constitute an anti-reflection film 3 in order from the side of the substrate 2. Here, the term "anti-reflection film" refers to a film that is formed on the surface of an optical element employed in the imaging optical system of a photographing lens for use in an optical apparatus such as a digital camera so as to avoid the occurrence of ghost and flare caused by unnecessary light. All of the values of refractive indices exemplified in the following description are defined by the wavelength of 550 nm.

The substrate 2 is a transparent member that consists of a glass and a resin and has a refractive index in the range of from 1.65 to 2.20. For ease of explanation, the shape of the substrate 2 is a flat plate (plane) as shown in FIG. 1, but may be a curved plate or a film-like plate. In addition, the surface of the substrate 2, on which the anti-reflection film 3 is formed, may also be a curved surface, a concave surface, or a convex surface.

The first layer 4 is a film that has a thickness in the range of from 30 to 70 nm and a refractive index in the range of from 1.52 to 1.82. The first layer 4 may be an organic resin layer containing, for example, polyimide. The second layer 5 formed on the first layer 4 is a film that is formed of a material different from that of the first layer 4 and has a thickness in the range of from 10 to 50 nm and a refractive index in the range of from 1.40 to 1.58. The second layer 5 may by a porous layer whose principal component is, for example, aluminum oxide. Furthermore, the third layer 6 formed on the second layer 5 is a concave-convex structure (concave-convex structured film) that has a thickness in the range of from 200 to 300 nm and has regions in which the refractive index substantially continuously changes from a value in the range of from 1.40 to 1.58 toward 1.0 (air). Here, the term "substantially continuously changes" does not mean that the refractive index of a material itself for a film continuously changes, but means that the effective refractive index changes by continuously changing the space filling factor of a fine concave-convex structure having an average pitch of 400 nm or less. This is because light has the property of not recognizing a concave-convex shape equal to or less than a wavelength of light itself but recognizing a concave-convex structure as a medium having an effective refractive index. When the effective refractive index is indicated by "$n_{\mathit{eff}}$", the refractive index of a material having a fine concave-convex shape equal to or less than a wavelength of light itself is indicated by "$n_m$", and the space filling factor of the material is indicated by "ff", the effective refractive index "$n_{\mathit{eff}}$" can be calculated using the Lorentz-Lorenz equation shown in the following Formula (1):

$$(n_{\mathit{eff}}^2-1)/(n_{\mathit{eff}}^2+2)=\mathit{ff}(n_m^2-1/(n_m^2+2) \tag{1}$$

In other words, if a structure having a pitch equal to or shorter than a wavelength of light itself and a continuously changing space filling factor of "ff" is formed, the third layer 6 becomes a structure of which the refractive index substantially continuously changes.

Figure 2:
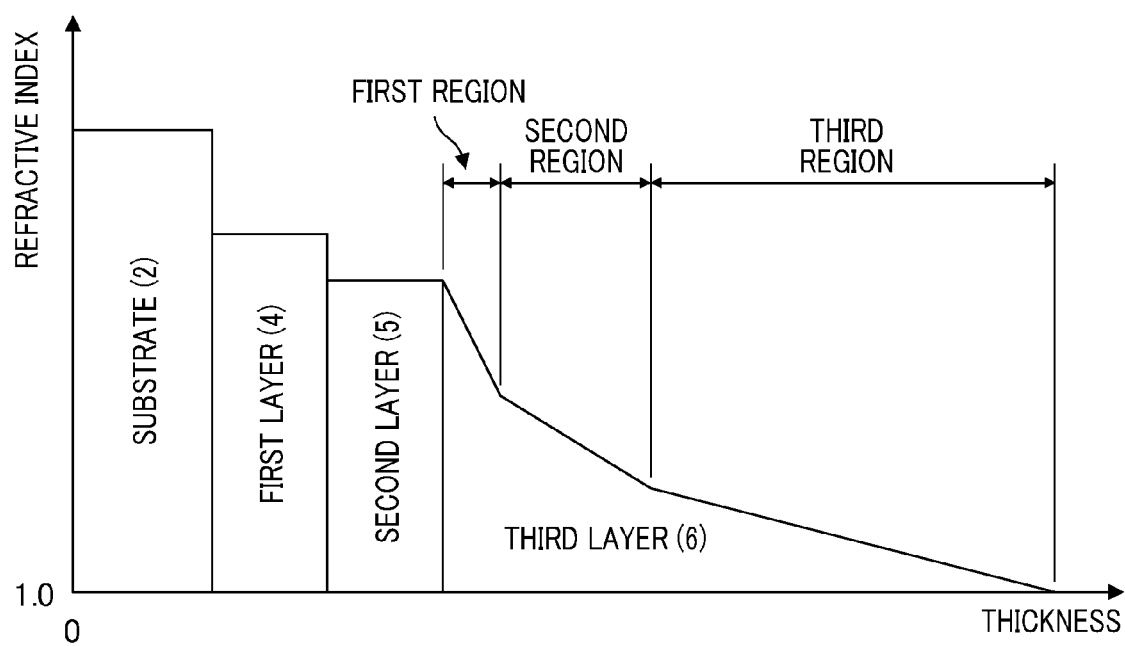
FIG. 2 is a graph illustrating a refractive index structure for an optical element according to one embodiment.

FIG. 2 is a graph schematically illustrating the refractive index structure of an optical element according to one embodiment. As shown in FIG. 2, the third layer 6 is different from the substrate 2, the first layer 4, and the second layer 5, and is formed by three regions of which the refractive index changes at a constant rate. Among these three regions, firstly, the first region positioned immediately above the second layer 5 has a thickness in the range of from 15 to 45 nm and a refractive index changing at a rate in the range of from 4.4 to $12\times10^{-3}$ nm$^{-1}$. Next, the second region positioned adjacent to the first region has a thickness in the range of from 25 to 75 nm and a refractive index changing at a rate in the range of from 1.9 to $4.3\times10^{-3}$ nm$^{-1}$. Furthermore, the uppermost third region positioned adjacent to the second region has a thickness in the range of from 120 to 200 nm and a refractive index changing at a rate in the range of from 0.9 to $1.8\times10^{-3}$ nm$^{-1}$. In the present embodiment, the third layer 6 is constituted by three regions. Thus, an anti-reflection film can be realized by a smaller number of regions while taking an advantage of wavelength band characteristics and incident angle characteristics to be described below and taking the number of manufacturing processes during region-forming into consideration. It should be noted that all of the films constituting the anti-reflection film 3 may preferably be formed using a wet process such as a spin coating method or the like instead of a dry process such as a vacuum deposition method, a sputtering method, or the like.

Figure 3A:
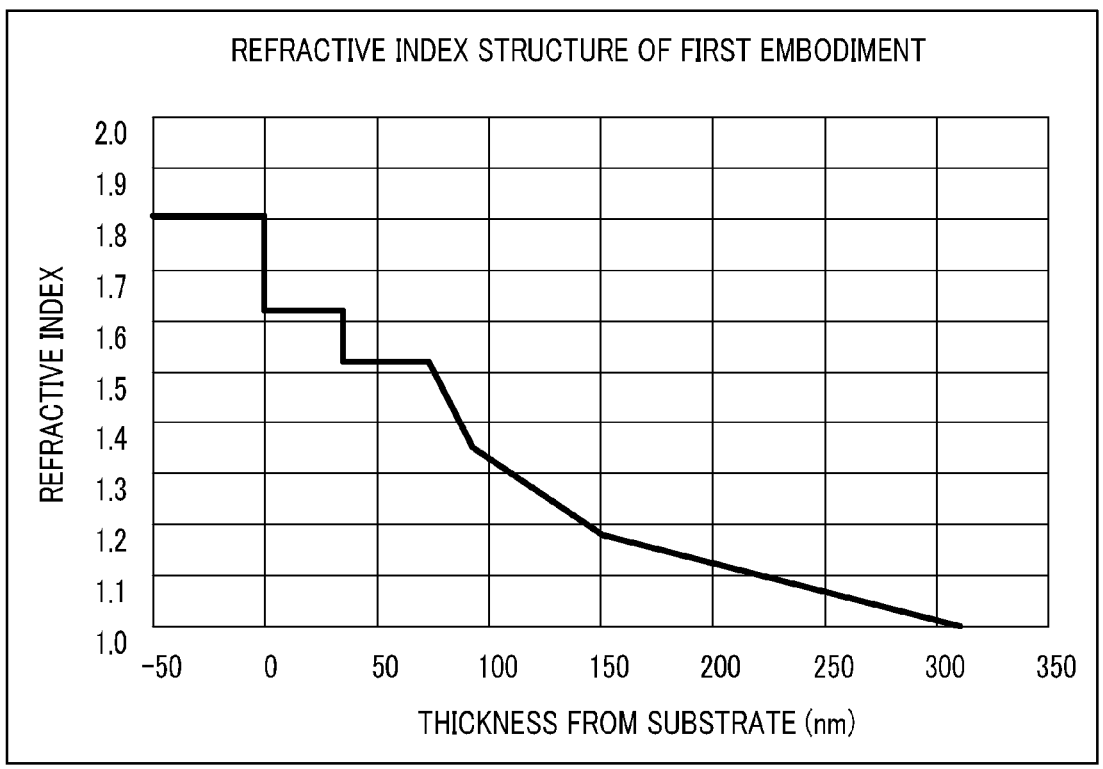
FIGS. 3A and 3B are graphs illustrating the structure and characteristics of an optical element according to a first embodiment.
Figure 3B:
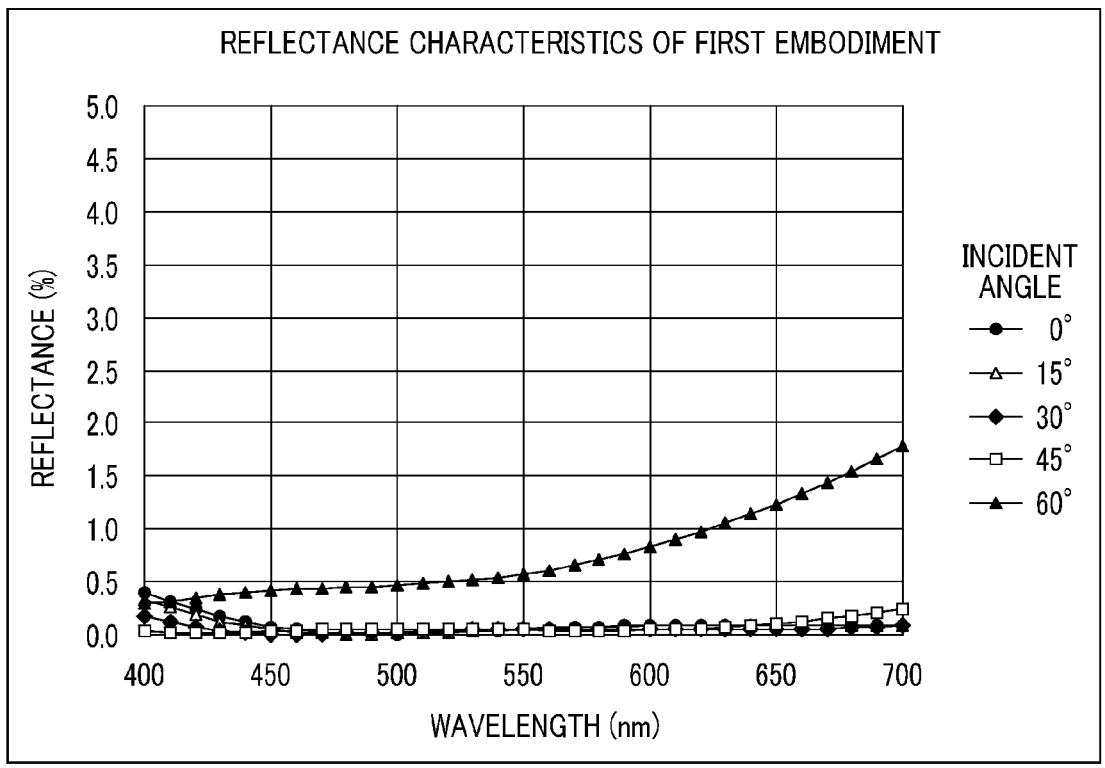

Next, a description will be given of the numerical values, materials, methods for forming the optical element 1, and the effect thereof as a specific example of the optical element 1 of the present embodiment. FIGS. 3A and 3B are graphs illustrating the structure and characteristics of the optical element 1 according to a first embodiment. In particular, FIG. 3A is a graph specifically illustrating the refractive index structure of the optical element 1 corresponding to FIG. 2. FIG. 3A shows a change in the refractive index indicated on the vertical axis to a thickness (thickness: nm) from the substrate 2 indicated on the horizontal axis. In the graph, a region having a negative thickness indicates the portion of the substrate 2. In the present embodiment, firstly, a glass material having a refractive index of 1.808 (S-LAH 65 manufactured by OHARA INC.) is employed as the substrate 2. Among the layers constituting the anti-reflection film 3, the first layer 4 is a film having a thickness of 35 nm and a refractive index of 1.620 and the second layer 5 is a film having a thickness of 38 nm and a refractive index of 1.520. Furthermore, the third layer 6 has a concave-convex structure having a thickness of 240 nm and a refractive index continuously changing from 1.52 to 1.0. The third layer 6 has three regions from the first region to the third region as described above. In this case, the first region has a thickness of 20 nm and a refractive index continuously changing at a rate of $8.5 \times 10^{-3}$ nm$^{-1}$, the second region has a thickness of 58 nm and a refractive index continuously changing at a rate of $2.93 \times 10^{-3}$ nm$^{-1}$, and the third region has a thickness of 162 nm and a refractive index continuously changing at a rate of $1.11 \times 10^{-3}$ nm$^{-1}$.

FIG. 3B is a graph illustrating the reflectance characteristics of the anti-reflection film 3 in this case. FIG. 3B shows a change in the reflectance (%), indicated on the vertical axis, to the wavelength (nm) of incident light on the optical element 1, indicated on the horizontal axis, at different incident angles. As shown in FIG. 3B, the reflectance is low across the entire visible wavelength region (wavelength: 400 to 700 nm), and thus, it can be seen that the optical element 1 exhibits high anti-reflection performance with the aid of the anti-reflection film 3. In particular, at an incident angle in the range of from 0 degrees to 45 degrees, the optical element 1 exhibits a reflectance of 0.5% or less across the entire visible wavelength region. In addition, even at a very large incident angle of 60 degrees, the optical element 1 still exhibits excellent anti-reflection performance such as reflectance of 1.8% or less.

Each of the first layer 4 to the third layer 6 may be formed with a material and a forming method as follows. Firstly, the material of the first layer 4 and the method for forming the same are not particularly limited as long as the aforementioned thickness and refractive index can be realized by a wet process as described above. As an example, the first layer 4 can be formed by applying a solution containing polyimide onto the substrate 2 using a spin coating method. In this case, the value of the refractive index 1.620 of the first layer 4 can be realized by appropriately adjusting the mixing ratio of a plurality of components having a different refractive index in polyimide, i.e., an aliphatic chain structure, an alicyclic structure, an aromatic ring structure, or the like contained in a polyimide solution. As a material other than polyimide, a melamine resin, a sulfur-containing resin, an iodine-containing resin, a bromine-containing resin, and the like which can realize a high refractive index of 1.65 or greater may also be used. In addition, an organic resin material in which $TiO_2$ having a high refractive index is mixed with inorganic fine particles having a particle diameter of 200 nm or less may also be used to realize a high refractive index exceeding 1.8. Of course, a resin material having a refractive index exceeding 1.8 may also be used alone.

Also, setting a desired thickness of the first layer 4 can be realized by taking into consideration the concentration of a polyimide solution, coating conditions (the number of spin rotations and rotation time), and the like. Next, as in the first layer 4, the material of the second layer 5 and the method for forming the same are also not particularly limited as long as the aforementioned thickness and refractive index can be realized by a wet process. For example, for forming the second layer 5, a solution whose principal component is silica ($SiO_2$) or a solution containing aluminum oxide ($Al_2O_3$) may be used. In contrast, the third layer 6 having a concave-convex structure can be formed as follows. For example, a solution containing aluminum oxide is applied onto the second layer 5 using a spin coating method and then dried to thereby form a film. Then, the formed film is immersed into warm water to thereby cause a plate-like crystal to be precipitated on the surface thereof. In this case, the refractive index structure including three regions can be set by appropriately adjusting the content of aluminum oxide in solution and the kinds and amounts of stabilizers, catalysts, and the like, and the thickness thereof can be set by appropriately changing application conditions (coating conditions). In this manner, the layers constituting the anti-reflection film 3 are formed by a spin coating method of a wet process. Thus, a uniform film thickness can be realized even when a surface on which a film is formed is a lens having a large curvature surface (in particular, a concave surface). Here, for example, it is also contemplated that the thickness of the central part and the thickness of the peripheral part of a member to be film-deposited may be made uniform by employing a dry process such as a vacuum deposition method and employing a method in which a shielding having an appropriate opening is provided between a deposition source and a member to be film-deposited, and a deposition material is deposited through the shielding onto the member to be film-deposited while rotating it. In this case, the deposition material to be deposited onto the member to be film-deposited may be adhered to the shielding, resulting in a reduction in the film-forming efficiency and a reduction in productivity. However, the wet process is also advantageous in terms of the productivity of the optical element 1.

Figure 4A:
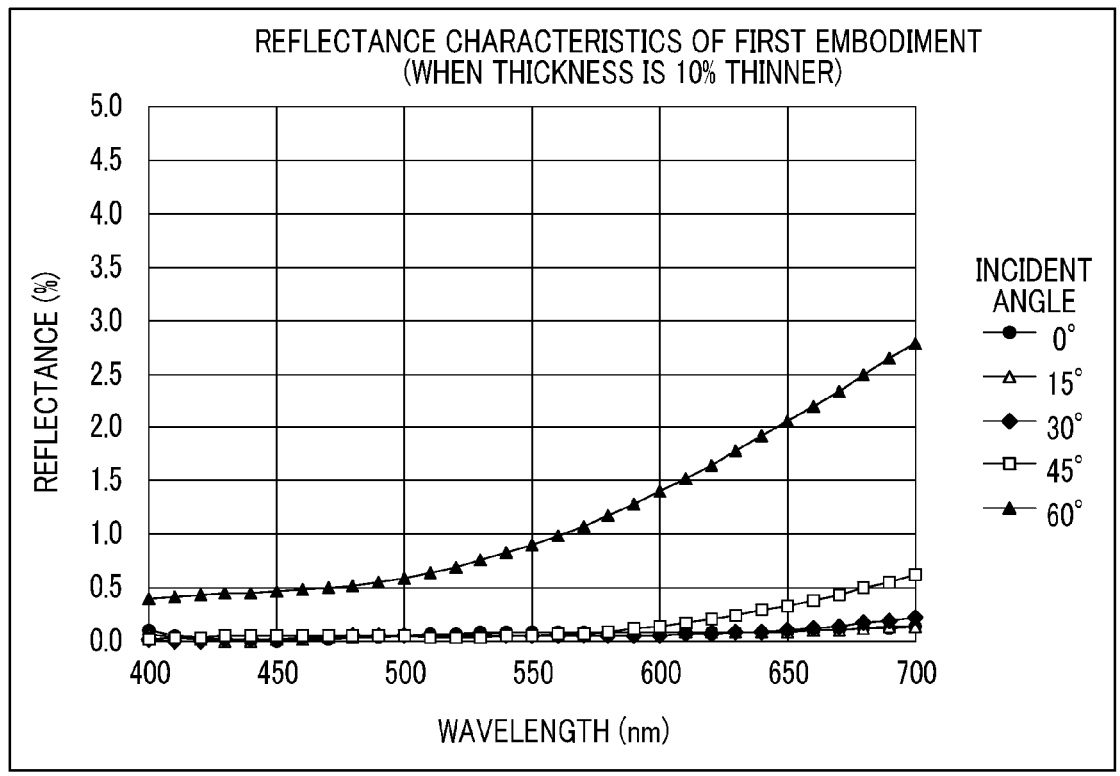
FIGS. 4A and 4B are graphs illustrating the characteristics of the optical element according to the first embodiment.
Figure 4B:
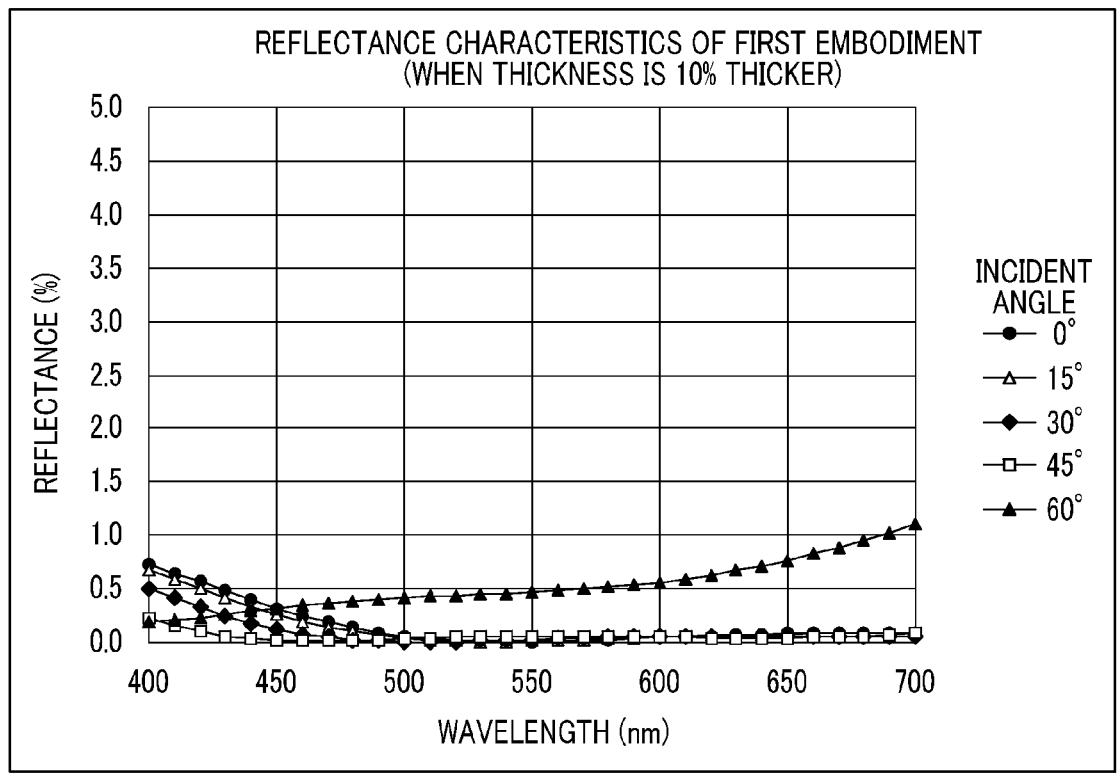

In addition, in the optical element 1 of the present embodiment, the reflectance characteristics of the anti-reflection film 3 do not change by a large amount even if fluctuations in thickness thereof may occur. In other words, the optical element 1 of the present embodiment has a wide tolerance with respect to fluctuations in thickness of the anti-reflection film 3. Each of FIGS. 4A and 4B is a graph illustrating the reflectance characteristics of the anti-reflection film 3 corresponding to FIG. 3B. In particular, FIG. 4A shows the reflectance characteristics of the anti-reflection film 3 in a case where the thickness of each of the layers constituting the anti-reflection film 3 is 10% thinner than that shown in FIG. 3B. Among these layers, the first layer 4 has a thickness of 31.5 nm, the second layer 5 has a thickness of 34.2 nm, and the third layer 6 has a thickness of 214 nm. As shown in FIG. 4A, although the reflectance has a slightly high value in a long wavelength range (up to 700 nm), the reflectance is generally suppressed to a low level. Therefore, it can also be seen that the optical element 1 exhibits sufficient anti-reflection performance with the aid of the anti-reflection film 3.

On the other hand, FIG. 4B shows the reflectance characteristics of the anti-reflection film 3 in a case where the thickness of each of the layers constituting the anti-reflection film 3 is 10% thicker than that shown in FIG. 3B. Among these layers, the first layer 4 has a thickness of 38.5 nm, the second layer 5 has a thickness of 41.8 nm, and the third layer 6 has a thickness of 261.8 nm. As shown in FIG. 4B, although the reflectance has a slightly high value in a short wavelength range (400 nm or greater), the reflectance is generally suppressed to a low level. Furthermore, the anti-reflection performance of the anti-reflection film 3 at the incident angle of 60 degrees is more improved than that shown in FIG. 3B.

Therefore, it can also be seen that the optical element 1 exhibits sufficient anti-reflection performance with the aid of the anti-reflection film 3.

As described above, according to the present embodiment, the optical element 1 having the anti-reflection film 3 that is advantageous not only for productivity but also for wavelength band characteristics and incident angle characteristics may be provided. In particular, the optical element 1 can have excellent anti-reflection performance in a wide wavelength band over the entire visible wavelength region and in a large incident angle range over the incident angles in the range of from 0 to 60 degrees or greater.

Second Embodiment

Figure 5A:
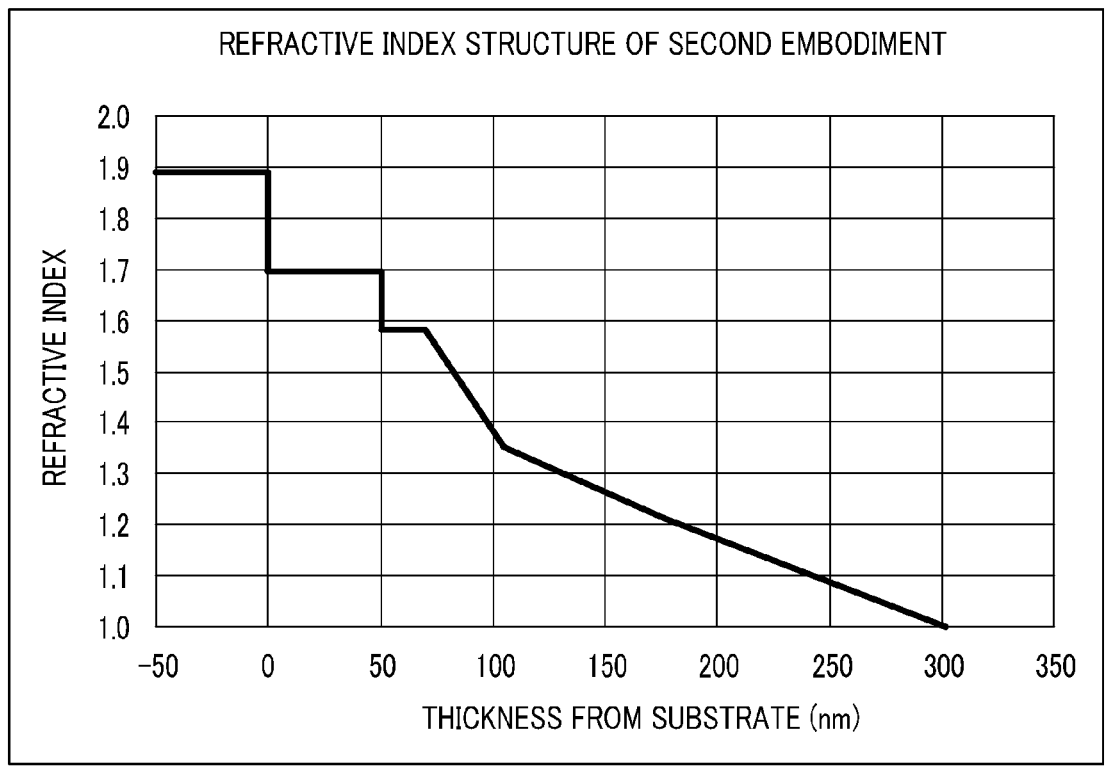
FIGS. 5A and 5B are graphs illustrating the structure and characteristics of an optical element according to a second embodiment.
Figure 5B:
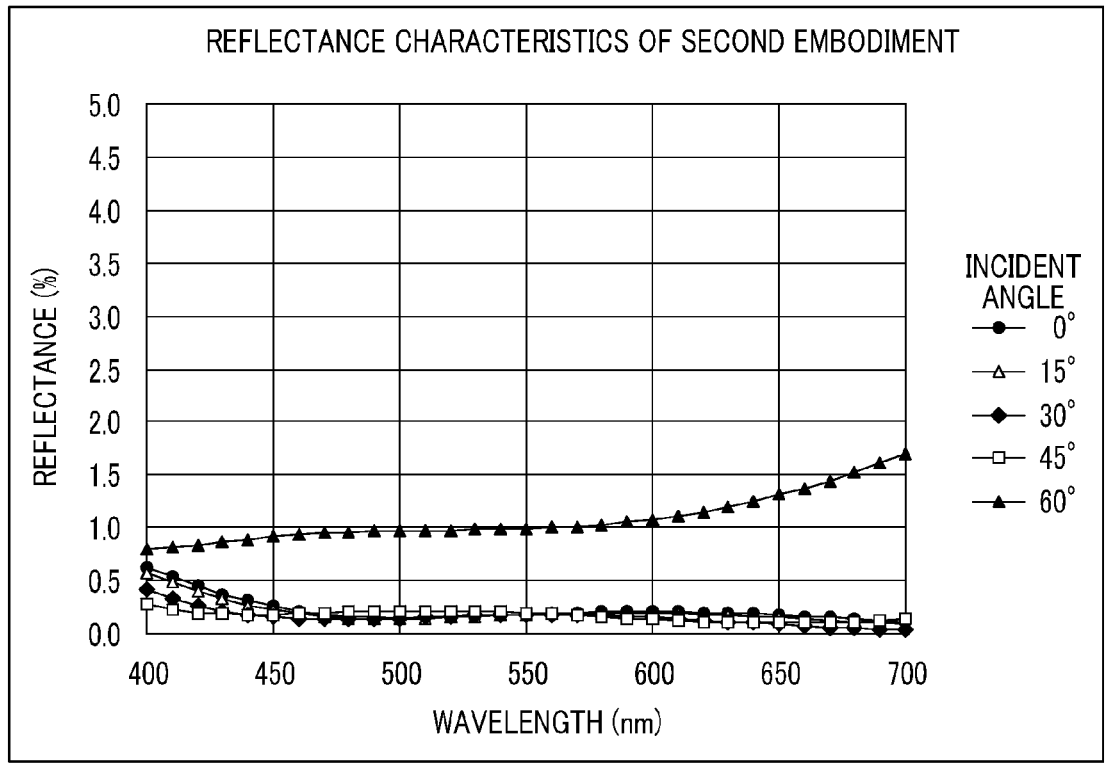

Next, a description will be given of an optical element according to a second embodiment of the present invention. The optical element of the present embodiment is the same as the optical element 1 of the first embodiment, except that the material of the substrate 2 and the thickness and the refractive index of each layer constituting the anti-reflection film 3 have been changed. FIGS. 5A and 5B are graphs illustrating the structure and characteristics of the optical element according to the present embodiment. In particular, FIG. 5A is a graph specifically illustrating the refractive index structure of the optical element corresponding to FIG. 2. For ease of explanation, the components of the optical element of the present embodiment are designated by the same reference numerals as those of the optical element 1 of the first embodiment. In the present embodiment, a glass material having a refractive index of 1.888 (S-LAH 58 manufactured by OHARA INC.) is employed as the substrate 2. Among the layers constituting the anti-reflection film 3, the first layer 4 is a film having a thickness of 50 nm and a refractive index of 1.695 and the second layer 5 is a film having a thickness of 20 nm and a refractive index of 1.580. Furthermore, the third layer 6 has a concave-convex structure having a thickness of 232 nm and a refractive index continuously changing from 1.58 to 1.0. The third layer 6 has three regions from the first region to the third region as described above. In this case, the first region has a thickness of 35 nm and a refractive index continuously changing at a rate of $6.57\times10^{-3}$ $nm^{-1}$, the second region has a thickness of 72 nm and a refractive index continuously changing at a rate of $1.94\times10^{-3}$ $nm^{-1}$, and the third region has a thickness of 125 nm and a refractive index continuously changing at a rate of $1.68\times10^{-3}$ $nm^{-1}$.

FIG. 5B is a graph illustrating the reflectance characteristics of the anti-reflection film 3 in this case, and corresponds to FIG. 3B. As shown in FIG. 5B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.7% or less across the entire visible wavelength region. In addition, even at a very large incident angle of 60 degrees, the optical element 1 still exhibits excellent anti-reflection performance such as reflectance of 1.8% or less. Also in the present embodiment, the same forming method and various adjustments as those of the first embodiment are applied.

Third Embodiment

Figure 6A:
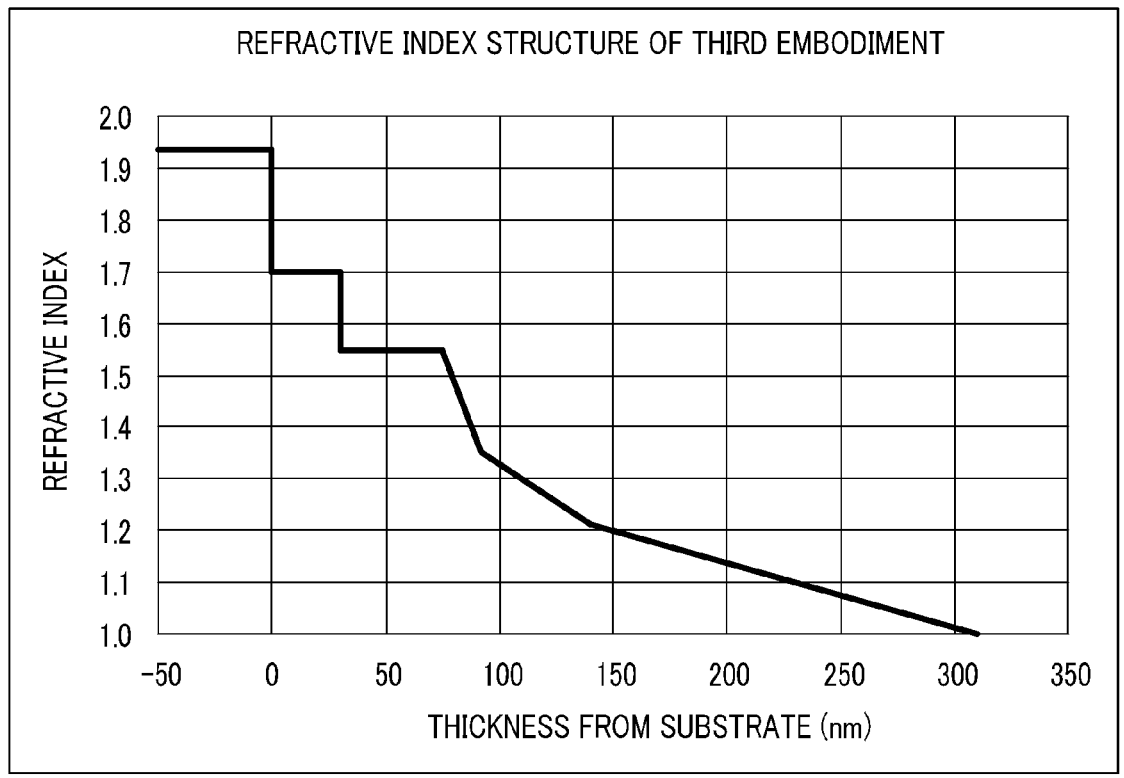
FIGS. 6A and 6B are graphs illustrating the structure and characteristics of an optical element according to a third embodiment.
Figure 6B:
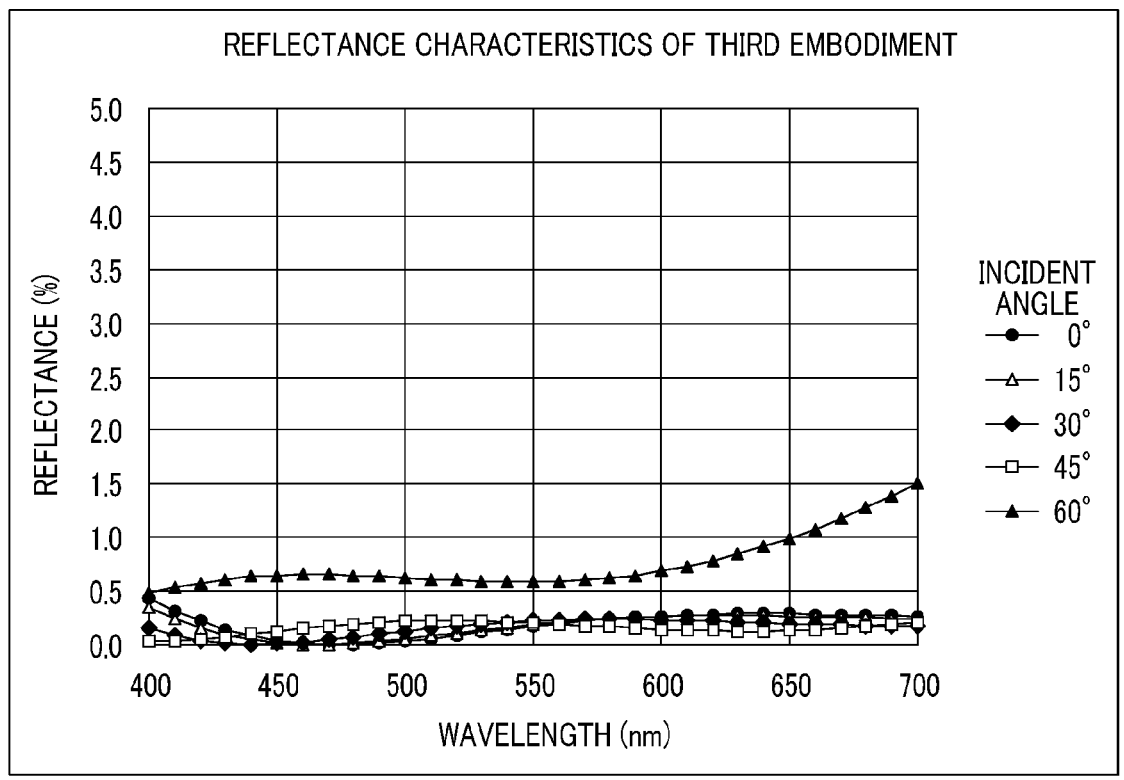

Next, a description will be given of an optical element according to a third embodiment of the present invention. The optical element of the present embodiment is also the same as the optical element 1 of the first embodiment, except that the material of the substrate 2 and the thickness and the refractive index of each layer constituting the anti-reflection film 3 have been changed. FIGS. 6A and 6B are graphs illustrating the structure and characteristics of the optical element according to the present embodiment. In particular, FIG. 6A is a graph specifically illustrating the refractive index structure of the optical element corresponding to FIG. 2. Also, the components of the optical element of the present embodiment are designated by the same reference numerals as those of the optical element 1 of the first embodiment. In the present embodiment, a glass material having a refractive index of 1.934 (S-NPH 2 manufactured by OHARA INC.) is employed as the substrate 2. Among the layers constituting the anti-reflection film 3, the first layer 4 is a film having a thickness of 30 nm and a refractive index of 1.70 and the second layer 5 is a film having a thickness of 45 nm and a refractive index of 1.55. Furthermore, the third layer 6 has a concave-convex structure having a thickness of 235 nm and a refractive index continuously changing from 1.55 to 1.0. The third layer 6 has three regions from the first region to the third region as described above. In this case, the first region has a thickness of 17 nm and a refractive index continuously changing at a rate of $11.76\times10^{-3}$ $nm^{-1}$, the second region has a thickness of 48 nm and a refractive index continuously changing at a rate of $2.92\times10^{-3}$ $nm^{-1}$, and the third region has a thickness of 170 nm and a refractive index continuously changing at a rate of $1.24\times10^{-3}$ $nm^{-1}$.

FIG. 6B is a graph illustrating the reflectance characteristics of the anti-reflection film 3 in this case, and corresponds to FIG. 3B. As shown in FIG. 6B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.5% or less across the entire visible wavelength region. In addition, even at a very large incident angle of 60 degrees, the optical element 1 still exhibits excellent anti-reflection performance such as reflectance of 1.5% or less. Also in the present embodiment, the same forming method and various adjustments as those of the first embodiment are applied.

Fourth Embodiment

Figure 7A:
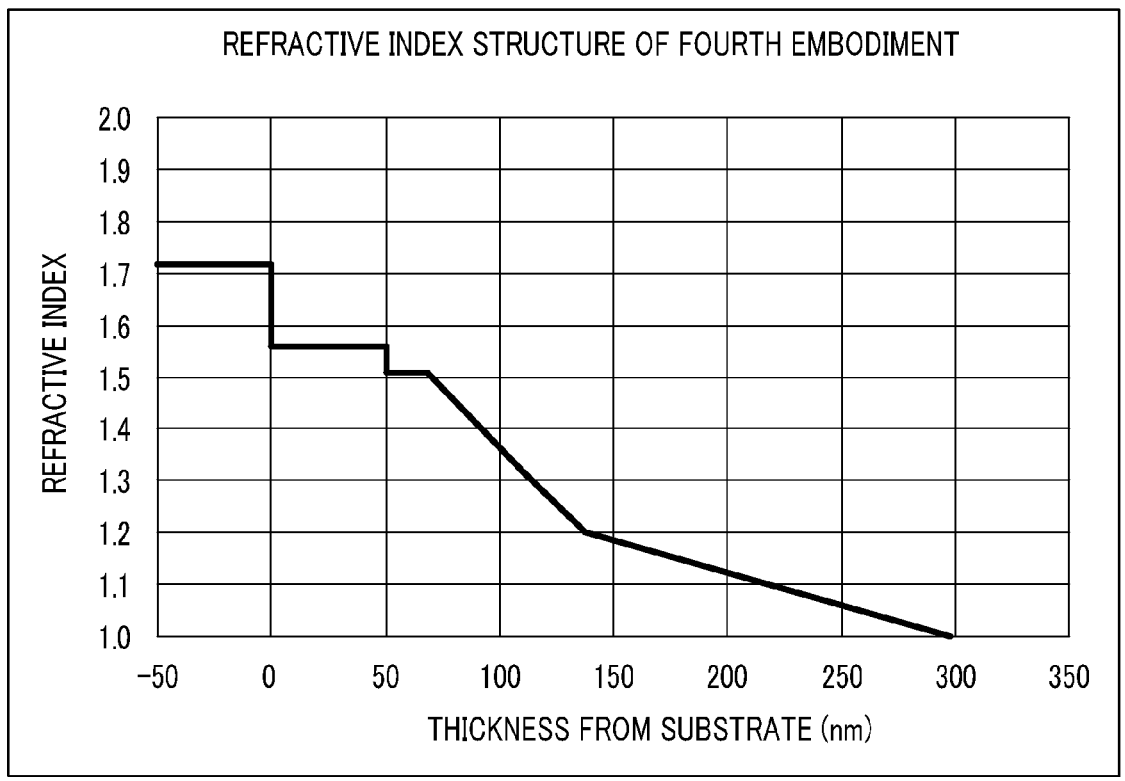
FIGS. 7A and 7B are graphs illustrating the structure and characteristics of an optical element according to a fourth embodiment.
Figure 7B:
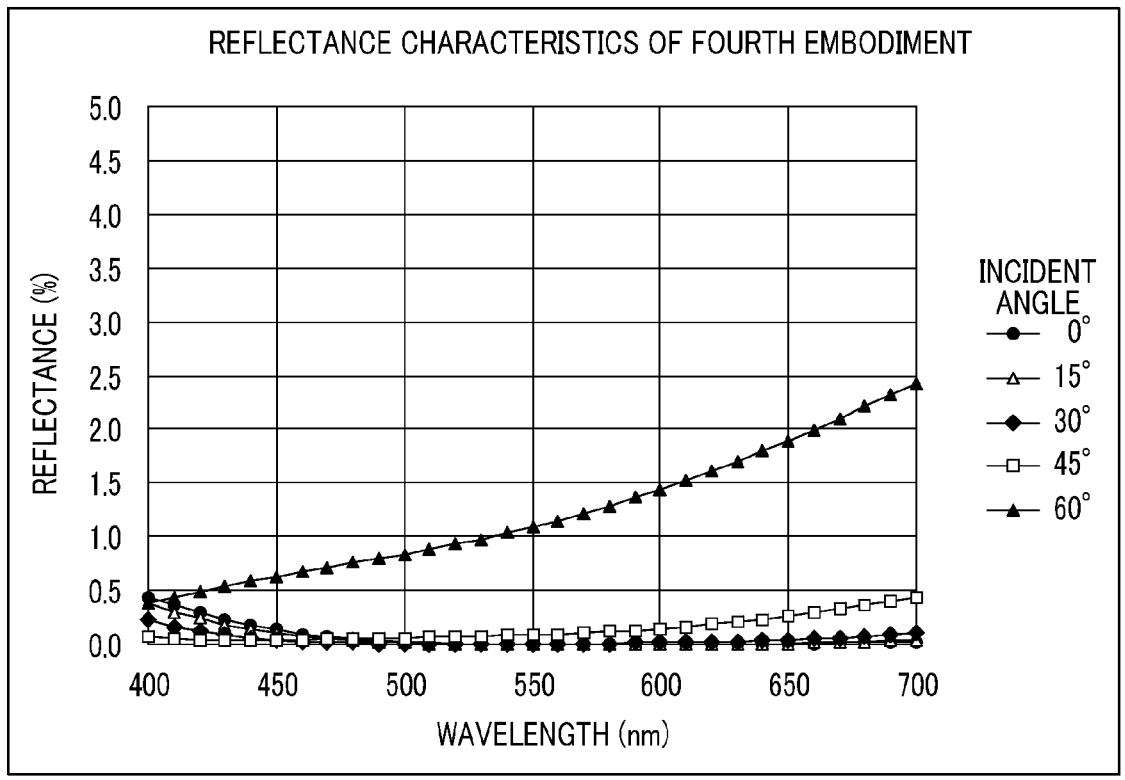

Next, a description will be given of an optical element according to a fourth embodiment of the present invention. The optical element of the present embodiment is also the same as the optical element 1 of the first embodiment, except that the material of the substrate 2 and the thickness and the refractive index of each layer constituting the anti-reflection film 3 have been changed. FIGS. 7A and 7B are graphs illustrating the structure and characteristics of the optical element according to the present embodiment. In particular, FIG. 7A is a graph specifically illustrating the refractive index structure of the optical element corresponding to FIG. 2. Also, the components of the optical element of the present embodiment are designated by the same reference numerals as those of the optical element 1 of the first embodiment. In the present embodiment, a glass material having a refractive index of 1.716 (S-LAL 8 manufactured by OHARA INC.) is employed as the substrate 2. Among the layers constituting the anti-reflection film 3, the first layer 4 is a film having a thickness of 50 nm and a refractive index of 1.56 and the second layer 5 is a film having a thickness of 18 nm and a refractive index of 1.51. Furthermore, the third layer 6 has a concave-convex structure having a thickness of 230 nm and a refractive index continuously changing from 1.51 to 1.0. The third layer 6 has three regions from the first region to the third region as described above. In this case, the first region has a thickness of 42 nm and a refractive index continuously changing at a rate of $4.52 \times 10^{-3}$ nm$^{-1}$, the second region has a thickness of 28 nm and a refractive index continuously changing at a rate of $4.29 \times 10^{-3}$ nm$^{-1}$, and the third region has a thickness of 160 nm and a refractive index continuously changing at a rate of $1.25 \times 10^{-3}$ nm$^{-1}$.

FIG. 7B is a graph illustrating the reflectance characteristics of the anti-reflection film 3 in this case, and corresponds to FIG. 3B. As shown in FIG. 7B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.5% or less across the entire visible wavelength region. In addition, even at a very large incident angle of 60 degrees, the optical element 1 still exhibits excellent anti-reflection performance such as reflectance of 2.5% or less. Also in the present embodiment, the same forming method and various adjustments as those of the first embodiment are applied.

Fifth Embodiment

Figure 8A:
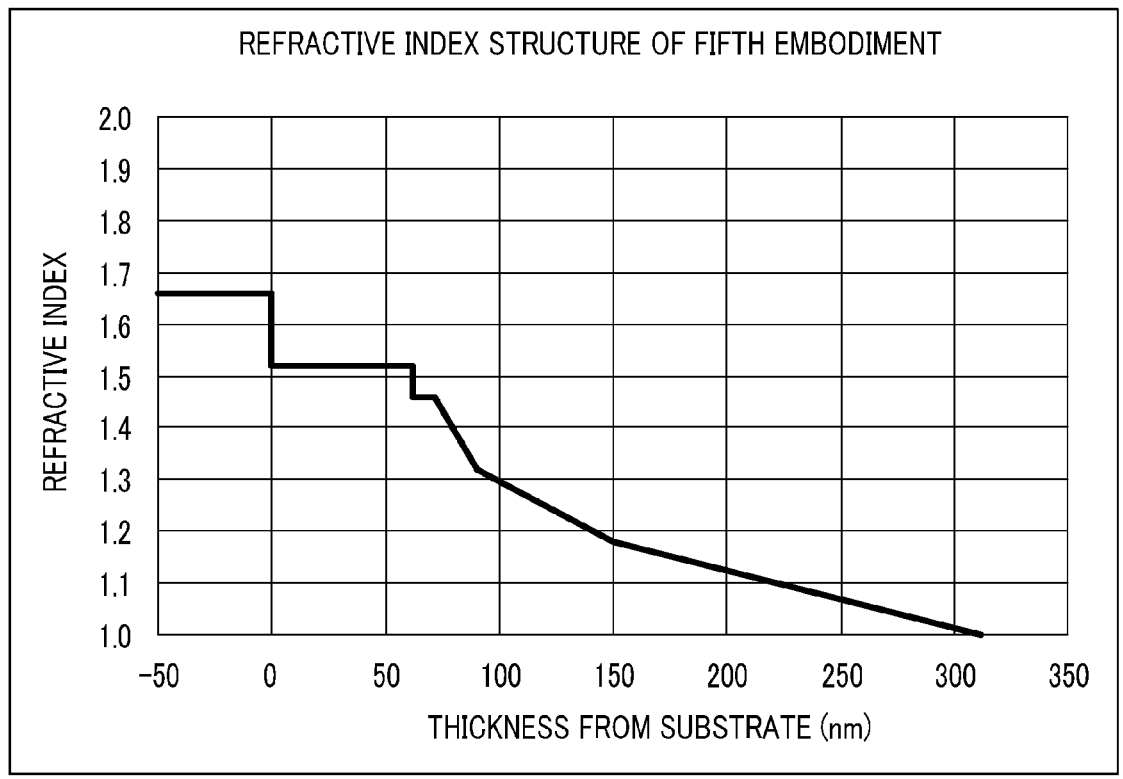
FIGS. 8A and 8B are graphs illustrating the structure and characteristics of an optical element according to a fifth embodiment.
Figure 8B:
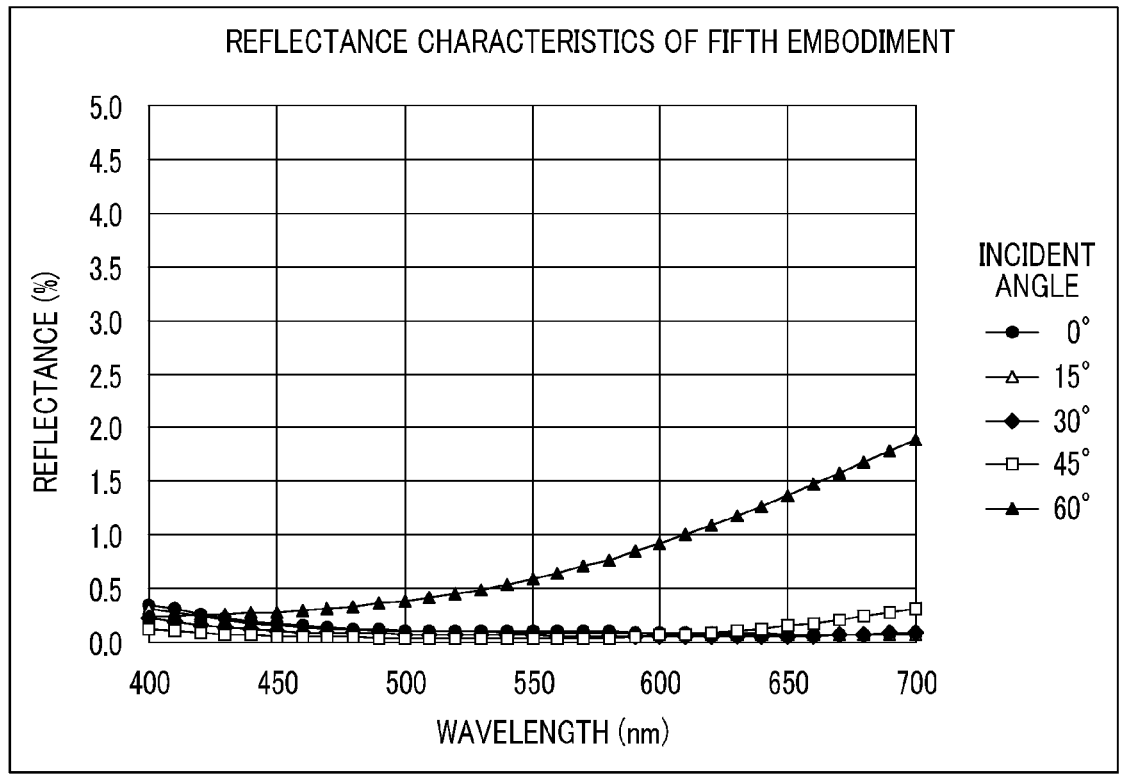

Next, a description will be given of an optical element according to a fifth embodiment of the present invention. The optical element of the present embodiment is also the same as the optical element 1 of the first embodiment, except that the material of the substrate 2 and the thickness and the refractive index of each layer constituting the anti-reflection film 3 have been changed. FIGS. 8A and 8B are graphs illustrating the structure and characteristics of the optical element according to the present embodiment. In particular, FIG. 8A is a graph specifically illustrating the refractive index structure of the optical element corresponding to FIG. 2. Also, the components of the optical element of the present embodiment are designated by the same reference numerals as those of the optical element 1 of the first embodiment. In the present embodiment, a glass material having a refractive index of 1.658 (S-NBH 5 manufactured by OHARA INC.) is employed as the substrate 2. Among the layers constituting the anti-reflection film 3, the first layer 4 is a film having a thickness of 62 nm and a refractive index of 1.52 and the second layer 5 is a film having a thickness of 10 nm and a refractive index of 1.46. Furthermore, the third layer 6 has a concave-convex structure having a thickness of 240 nm and a refractive index continuously changing from 1.46 to 1.0. The third layer 6 has three regions from the first region to the third region as described above. In this case, the first region has a thickness of 18 nm and a refractive index continuously changing at a rate of $7.78 \times 10^{-3}$ nm$^{-1}$, the second region has a thickness of 60 nm and a refractive index continuously changing at a rate of $2.33 \times 10^{-3}$ nm$^{-1}$, and the third region has a thickness of 162 nm and a refractive index continuously changing at a rate of $1.11 \times 10^{-3}$ nm$^{-1}$.

FIG. 8B is a graph illustrating the reflectance characteristics of the anti-reflection film 3 in this case corresponding to FIG. 3B. As shown in FIG. 8B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.4% or less across the entire visible wavelength region. In addition, even at a very large incident angle of 60 degrees, the optical element 1 still exhibits excellent anti-reflection performance such as reflectance of 2.0% or less. Also in the present embodiment, the same forming method and various adjustments as those of the first embodiment are applied.

Sixth Embodiment

Figure 9A:
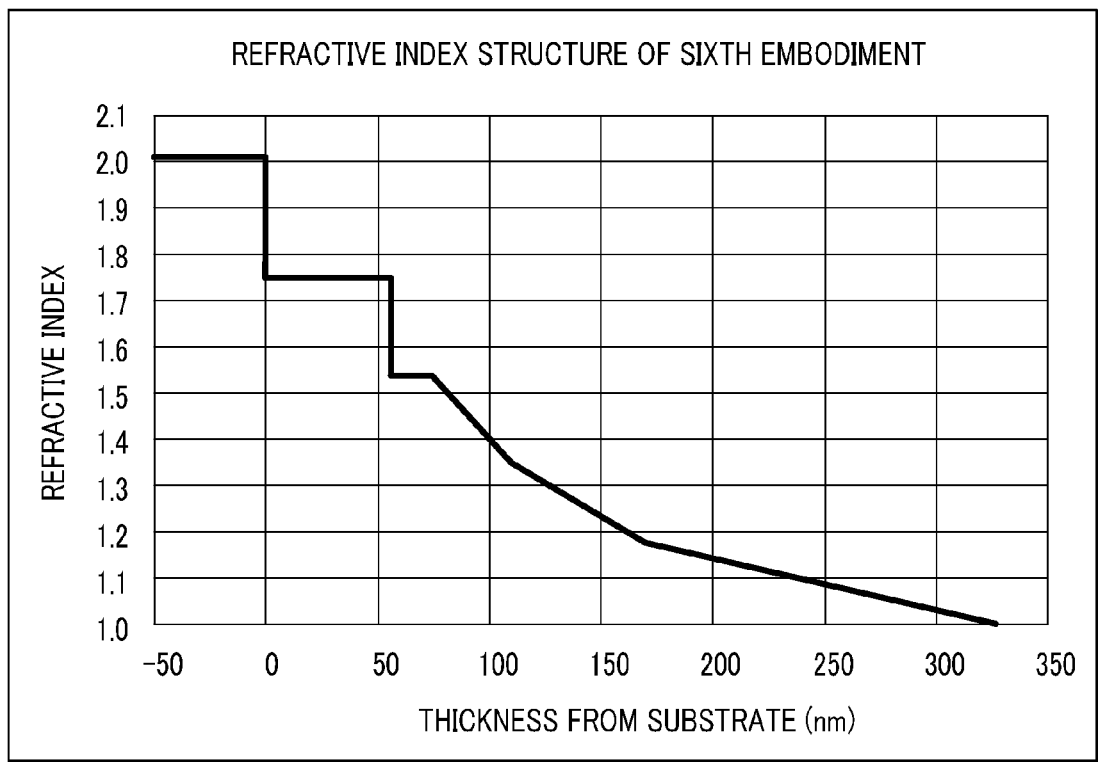
FIGS. 9A and 9B are graphs illustrating the structure and characteristics of an optical element according to a sixth embodiment.
Figure 9B:
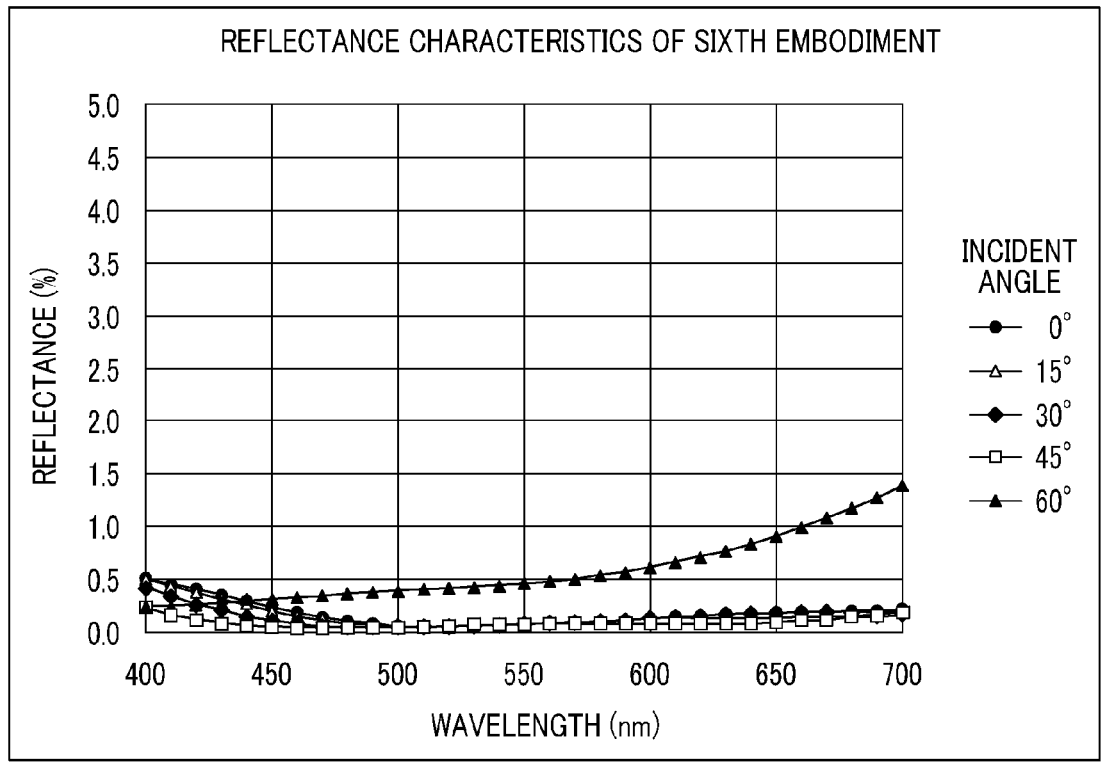

Next, a description will be given of an optical element according to a sixth embodiment of the present invention. The optical element of the present embodiment is also the same as the optical element 1 of the first embodiment, except that the material of the substrate 2 and the thickness and the refractive index of each layer constituting the anti-reflection film 3 have been changed. FIGS. 9A and 9B are graphs illustrating the structure and characteristics of the optical element according to the present embodiment. In particular, FIG. 9A is a graph specifically illustrating the refractive index structure of the optical element corresponding to FIG. 2. Also, the components of the optical element of the present embodiment are designated by the same reference numerals as those of the optical element 1 of the first embodiment. In the present embodiment, a glass material having a refractive index of 2.011 (S-LAH 79 manufactured by OHARA INC.) is employed as the substrate 2. Among the layers constituting the anti-reflection film 3, the first layer 4 is a film having a thickness of 55 nm and a refractive index of 1.75 and the second layer 5 is a film having a thickness of 18 nm and a refractive index of 1.54. Furthermore, the third layer 6 has a concave-convex structure having a thickness of 256 nm and a refractive index continuously changing from 1.54 to 1.0. The third layer 6 has three regions from the first region to the third region as described above. In this case, the first region has a thickness of 36 nm and a refractive index continuously changing at a rate of $5.28 \times 10^{-3}$ nm$^{-1}$, the second region has a thickness of 60 nm and a refractive index continuously changing at a rate of $2.83 \times 10^{-3}$ nm$^{-1}$, and the third region has a thickness of 160 nm and a refractive index continuously changing at a rate of $1.13 \times 10^{-3}$ nm$^{-1}$.

FIG. 9B is a graph illustrating the reflectance characteristics of the anti-reflection film 3 in this case corresponding to FIG. 3B. As shown in FIG. 9B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.6% or less across the entire visible wavelength region. In addition, even at a very large incident angle of 60 degrees, the optical element 1 still exhibits excellent anti-reflection performance such as reflectance of 1.5% or less. Also in the present embodiment, the same forming method and various adjustments as those of the first embodiment are applied.

Seventh Embodiment

Figure 10A:
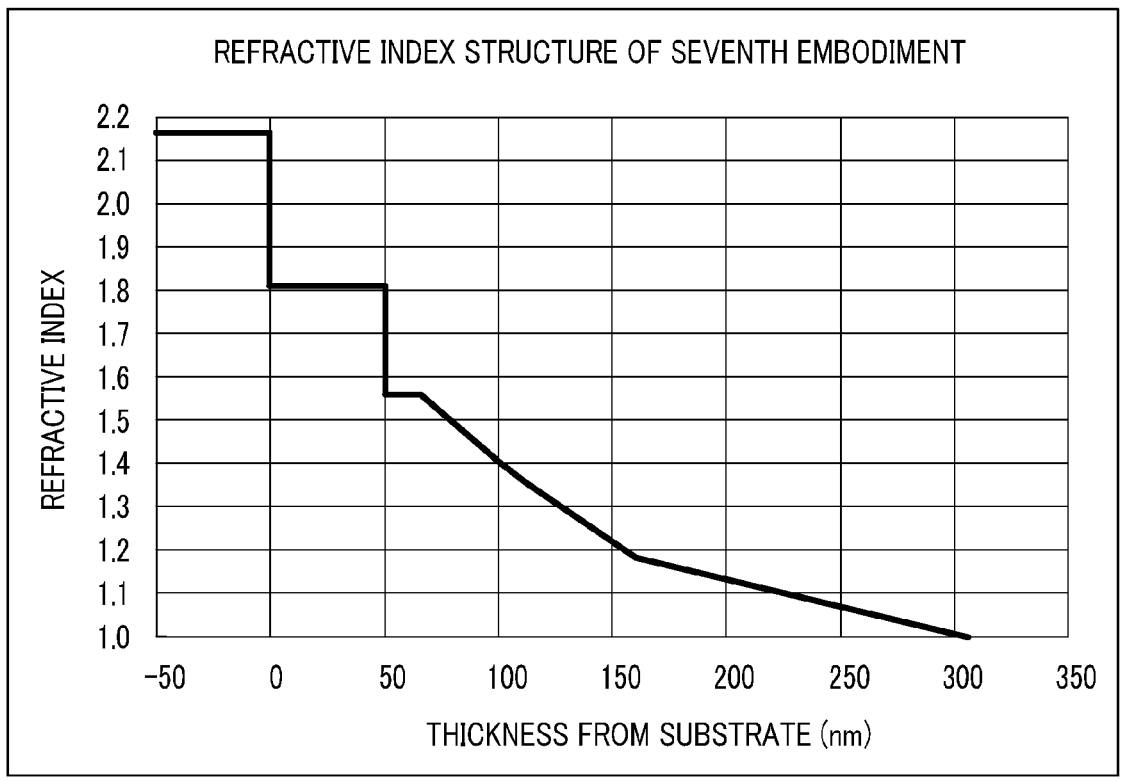
FIGS. 10A and 10B are graphs illustrating the structure and characteristics of an optical element according to a seventh embodiment.
Figure 10B:
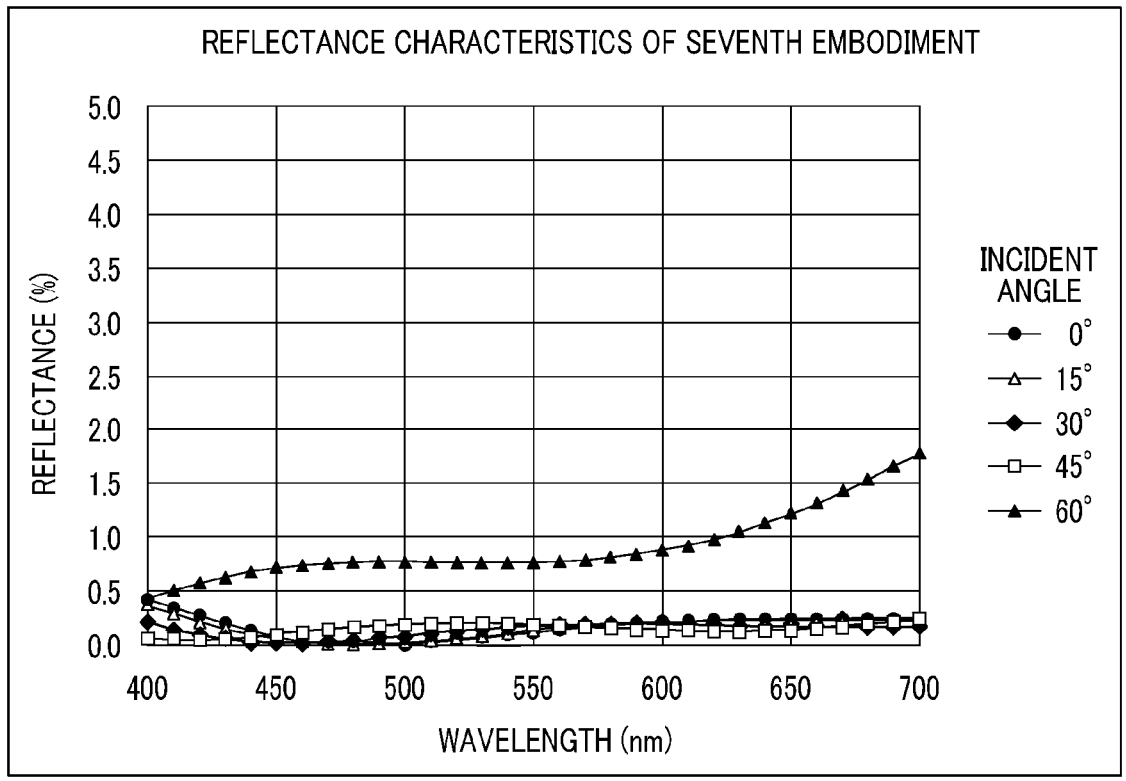

Next, a description will be given of an optical element according to a seventh embodiment of the present invention. The optical element of the present embodiment is also the same as the optical element 1 of the first embodiment, except that the material of the substrate 2 and the thickness and the refractive index of each layer constituting the anti-reflection film 3 have been changed. FIGS. 10A and 10B are graphs illustrating the structure and characteristics of the optical element according to the present embodiment. In particular, FIG. 10A is a graph specifically illustrating the refractive index structure of the optical element corresponding to FIG. 2. Also, the components of the optical element of the present embodiment are designated by the same reference numerals as those of the optical element 1 of the first embodiment. In the present embodiment, a glass material having a refractive index of 2.170 (K-PSFn 215 manufactured by OHARA INC.) is employed as the substrate 2. Among the layers constituting the anti-reflection film 3, the first layer 4 is a film having a thickness of 50 nm and a refractive index of 1.81 and the second layer 5 is a film having a thickness of 16 nm and a refractive index of 1.56. Furthermore, the third layer 6 has a concave-convex structure having a thickness of 240 nm and a refractive index continuously changing from 1.56 to 1.0. The third layer 6 has three regions from the first region to the third region as described above. In this case, the first region has a thickness of 40 nm and a refractive index continuously changing at a rate of $4.5 \times 10^{-3}$ nm$^{-1}$, the second region has a thickness of 55 nm and a refractive index continuously changing at a rate of $3.64 \times 10^{-3}$ nm$^{-1}$, and the third region has a thickness of 145 nm and a refractive index continuously changing at a rate of $1.24 \times 10^{-3}$ nm$^{-1}$.

FIG. 10B is a graph illustrating the reflectance characteristics of the anti-reflection film 3 in this case corresponding to FIG. 3B. As shown in FIG. 10B, the reflectance is low across the entire visible wavelength region, and thus, it can be seen that the optical element 1 of the present embodiment also exhibits high anti-reflection performance with the aid of the anti-reflection film 3. In particular, at an incident angle in the range of from 0 degrees to 45 degrees, the optical element 1 exhibits a reflectance of 0.5% or less across the entire visible wavelength region. In addition, even at a very large incident angle of 60 degrees, the optical element 1 still exhibits excellent anti-reflection performance such as reflectance of 1.8% or less. Also in the present embodiment, the same forming method and various adjustments as those of the first embodiment are applied.

First Comparative Example

Figure 11A:
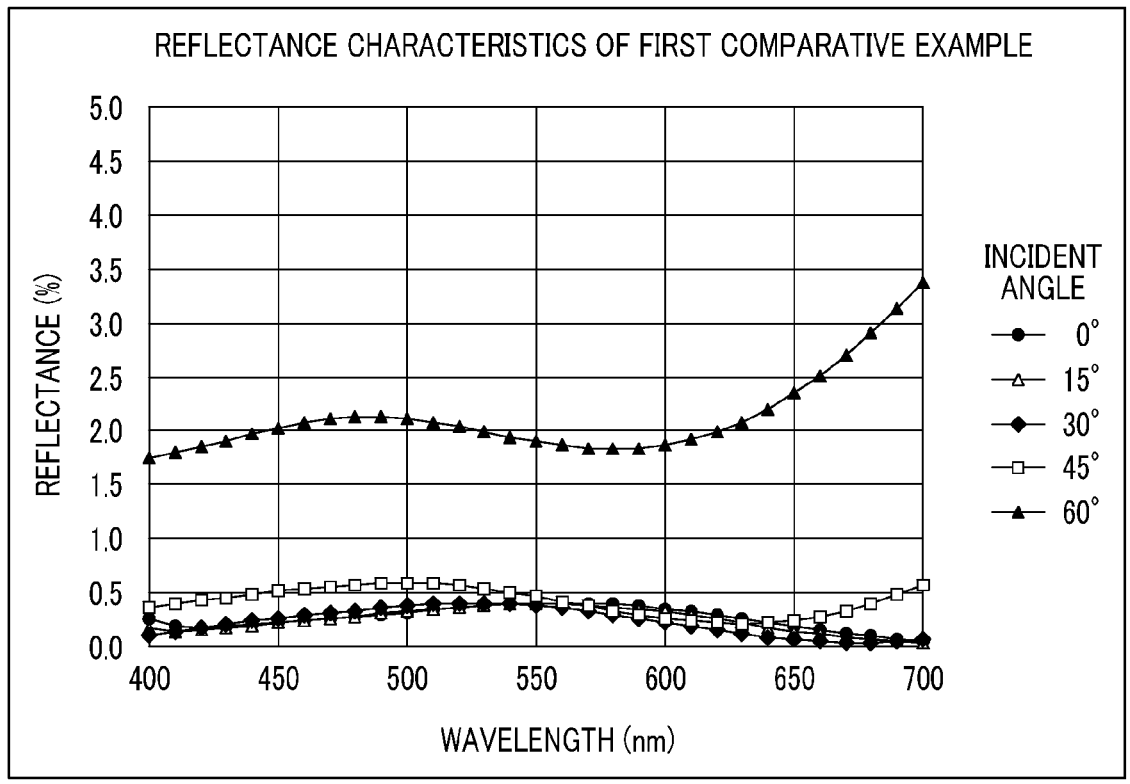
FIGS. 11A and 11B are graphs illustrating the structure and characteristics of an optical element according to a first comparative example.
Figure 11B:
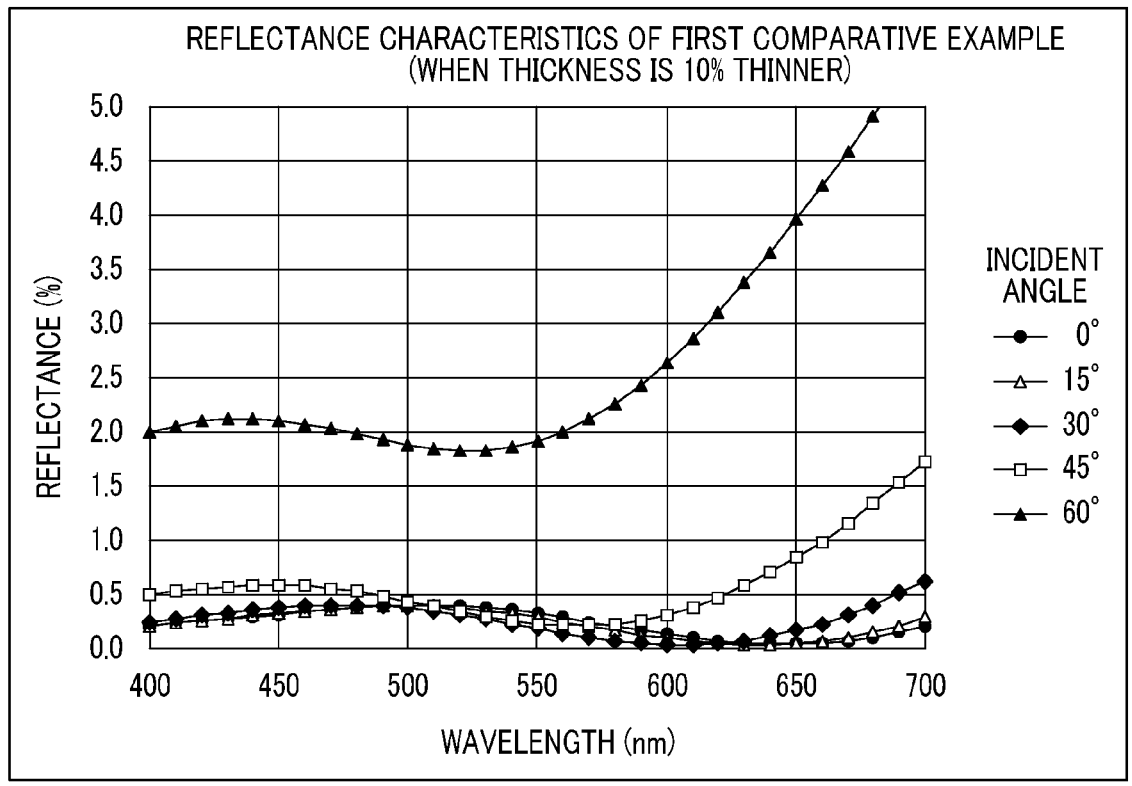
Figure 12A:
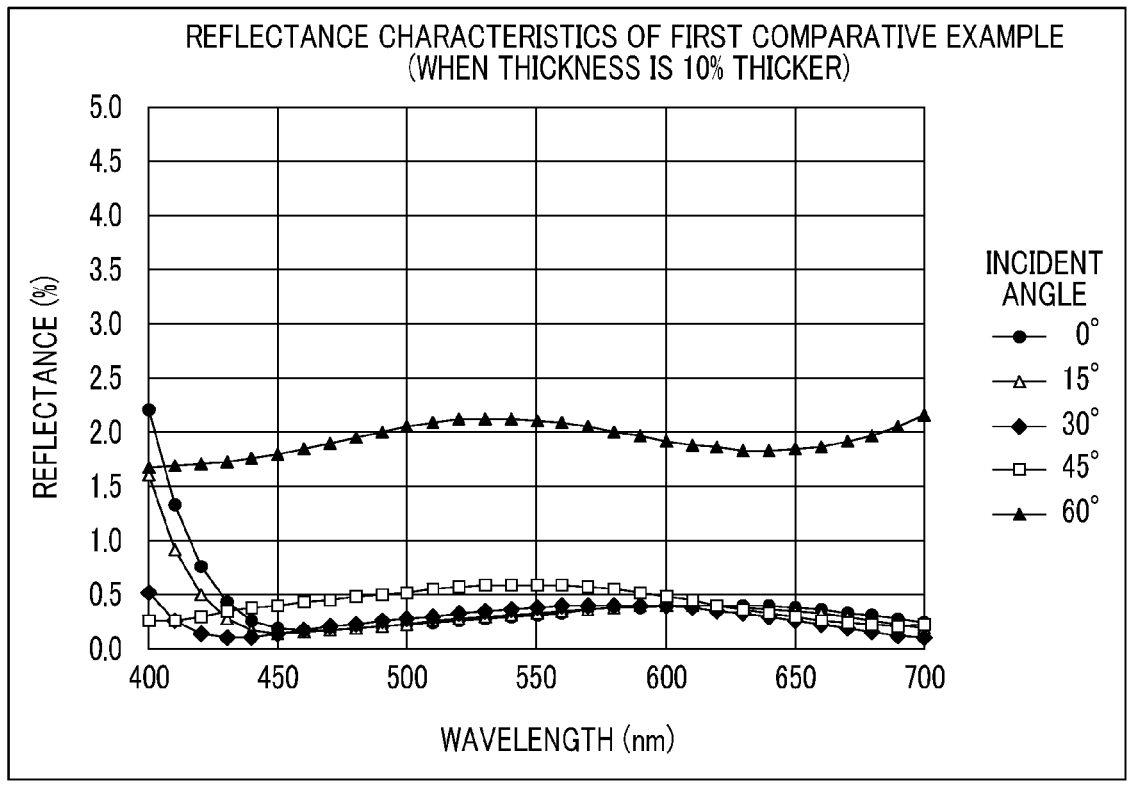
FIGS. 12A and 12B are graphs illustrating the structure and characteristics of an optical element according to the first comparative example.

Next, a description will be given as a reference for an optical element of a first comparative example with respect to the optical element 1 of the aforementioned embodiments. In the first comparative example, in particular, the optical element is compared with the optical element having an anti-reflection film disclosed in Japanese Patent No. 4433390 corresponding to the prior art. Firstly, FIG. 11A to FIG. 12B are graphs illustrating the reflectance characteristics of the optical element of the first comparative example having an anti-reflection film, which have been calculated based on the configuration disclosed in Japanese Patent No. 4433390. These drawings correspond to a graph illustrating the reflectance characteristics of the optical element 1 according to the embodiments, such as the graph shown in FIG. 3B or the like. In particular, FIG. 11A is a graph illustrating the results that are substantially the same as those disclosed in Japanese Patent No. 4433390, although there is a slight amount of error caused by the lack of taking the refractive index distribution of the substrate and of each layer constituting the anti-reflection film into consideration. Next, FIG. 11B is a graph illustrating the reflectance characteristics of the optical element in a case where the thickness of each of the layers constituting the anti-reflection film is 10% thinner than that disclosed in Japanese Patent No. 4433390. In this case, the optical thickness (optical film thickness) of the first layer is 0.243$\lambda$, the optical thickness of the second layer is 0.063$\lambda$, the optical thickness of the third layer is 0.27$\lambda$, and the optical thickness of the fourth layer is 0.234$\lambda$. Next, FIG. 12A is a graph illustrating the reflectance characteristics of the optical element in a case where the thickness of each of the layers constituting the anti-reflection film is 10% thicker than that disclosed in Japanese Patent No. 4433390. In this case, the optical thickness of the first layer is 0.297$\lambda$, the optical thickness of the second layer is 0.077$\lambda$, the optical thickness of the third layer is 0.33$\lambda$, and the optical thickness of the fourth layer is 0.286$\lambda$. As is evident from these results, it can be seen that the optical element 1 of the embodiments exhibits excellent anti-reflection performance because the optical element 1 of the embodiments has less fluctuation in the reflectance characteristics when the thickness of each layer constituting an anti-reflection film changes ±10%.

Figure 12B:
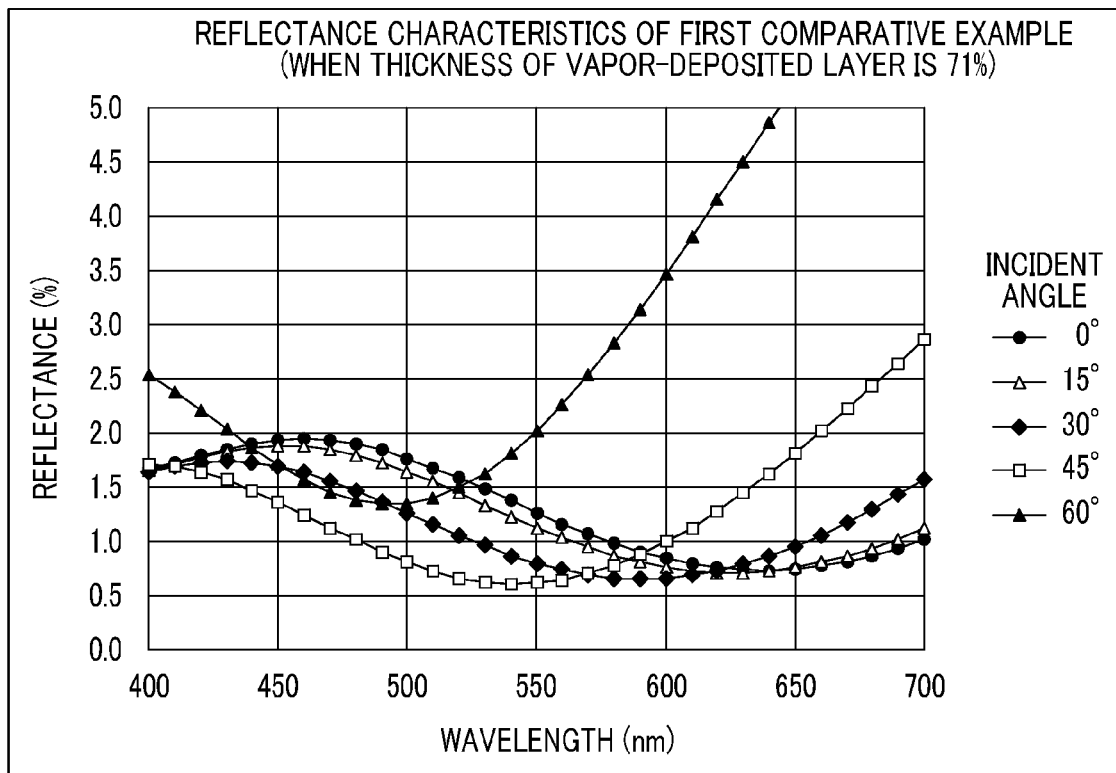

On the other hand, the anti-reflection film disclosed in Japanese Patent No. 4433390 is formed by a vacuum deposition method. Thus, if such an anti-reflection film is formed on the optical surface of a lens having a large curvature, the thickness of a vapor-deposited layer constituted by a first layer to a third layer at a position corresponding to an opening angle of 45 degrees is 71% of total thickness. In consideration of this case, FIG. 12B is a graph illustrating the reflectance characteristics of the optical element having the configuration disclosed in Japanese Patent No. 4433390 when the thickness of the vapor-deposited layer of an anti-reflection film is 71% of the total thickness including a fourth layer. As shown in FIG. 12B, it can be seen that the anti-reflection performance is significantly impaired at the peripheral part of a lens when a substrate is a lens having a large curvature.

Second Comparative Example

Figure 13A:
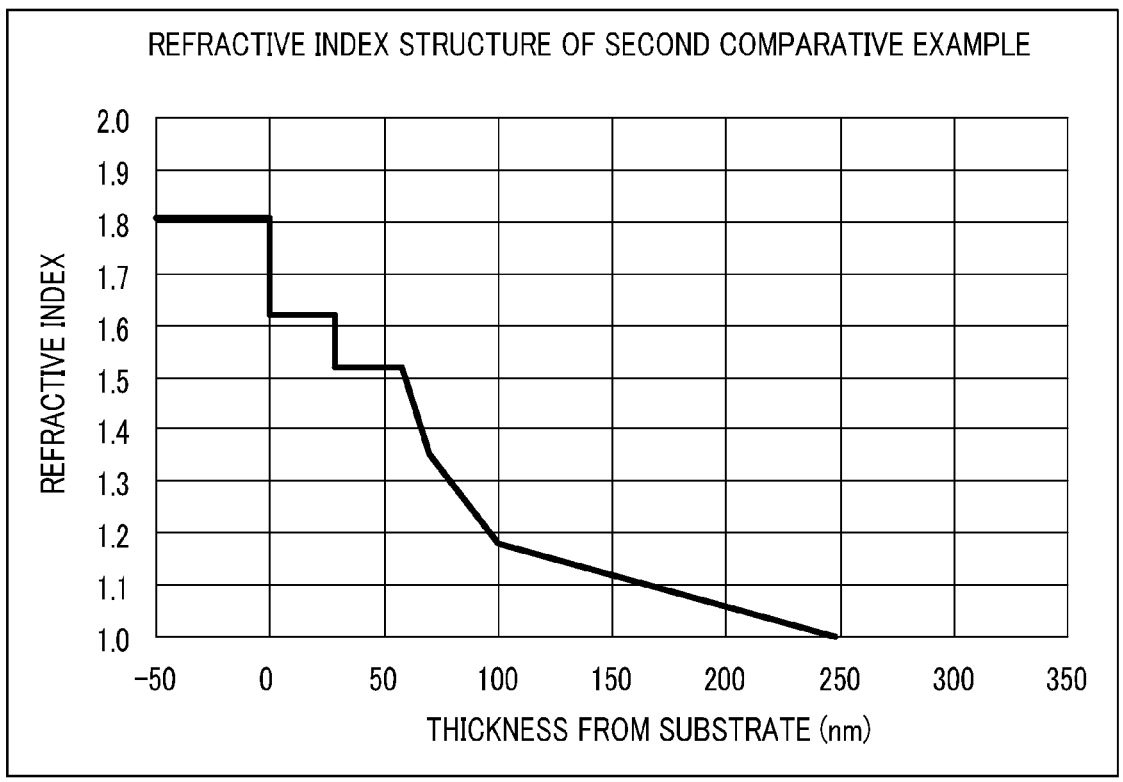
FIGS. 13A and 13B are graphs illustrating the structure and characteristics of an optical element according to a second comparative example.
Figure 13B:
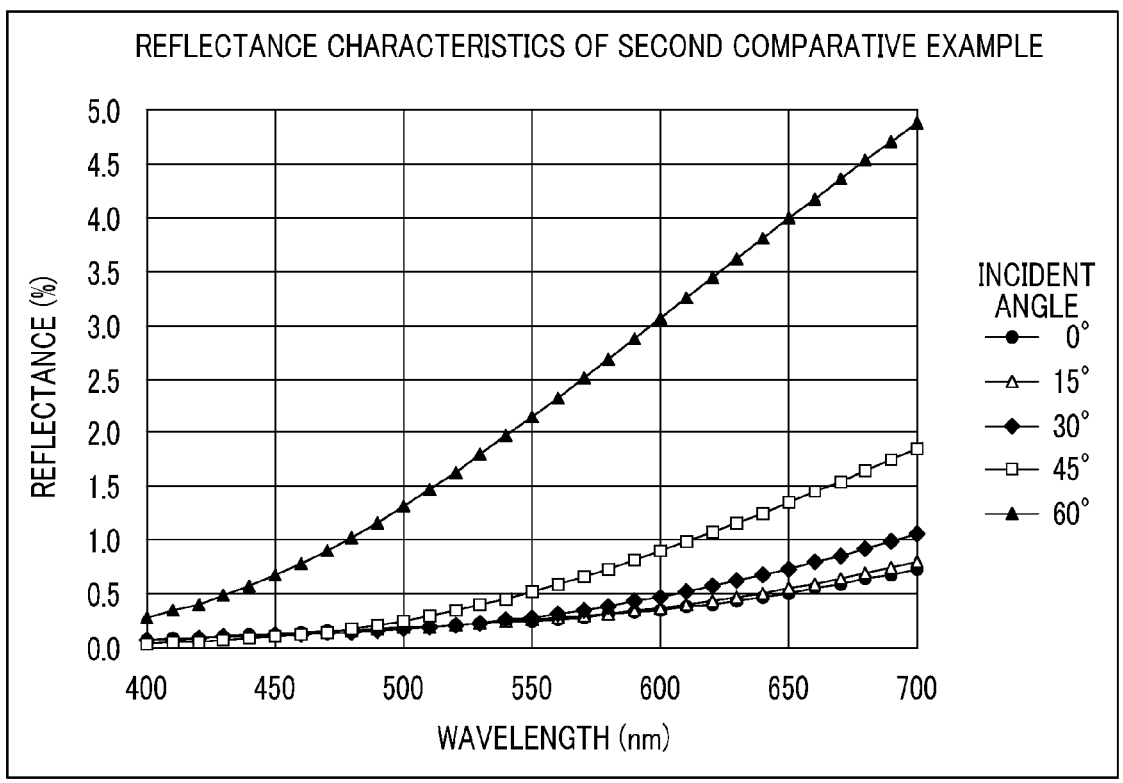

Also, a description will be given as a reference for an optical element of a second comparative example with respect to the optical element 1 of the aforementioned embodiments. In the second comparative example, a comparison is specifically made between the optical element 1 of the embodiments and an optical element having a configuration deviating from the various numerical limitations in the embodiments. FIGS. 13A and 13B are graphs illustrating the structure and characteristics of an optical element according to a second comparative example. In particular, FIG. 13A is a graph specifically illustrating the refractive index structure of the optical element 1 corresponding to FIG. 2. Also, the components of the optical element of the present embodiment are designated by the same reference numerals as those of the optical element 1 of the first embodiment. As in the first embodiment, in the present comparative example, a glass material having a refractive index of 1.808 (S-LAH 65 manufactured by OHARA INC.) is employed as the substrate 2. Among the layers constituting the anti-reflection film 3, the first layer 4 is a film having a thickness of 28 nm and a refractive index of 1.620 and the second layer 5 is a film having a thickness of 30 nm and a refractive index of 1.52. Furthermore, the third layer 6 has a concave-convex structure having a thickness of 190 nm and a refractive index continuously changing from 1.52 to 1.0. As in the first embodiment, the third layer 6 also has three regions from the first region to the third region. In this case, the first region has a thickness of 12 nm and a refractive index continuously changing at a rate of $14.17 \times 10^{-3}$ nm$^{-1}$, the second region has a thickness of 30 nm and a refractive index continuously changing at a rate of $5.67 \times 10^{-3}$ nm$^{-1}$, and the third region has a thickness of 148 nm and a refractive index continuously changing at a rate of $1.22 \times 10^{-3}$ nm$^{-1}$.

FIG. 13B is a graph illustrating the reflectance characteristics of the anti-reflection film 3 in this case corresponding to FIG. 3B. As shown in FIG. 13B, the reflectance becomes 0.7% or greater at a wavelength of 700 nm when the incident angle is 0 degrees. Furthermore, the reflectance characteristics are deteriorated with an increase in the incident angle. In particular, when the incident angle is 60 degrees, the reflectance reaches closer to 5% at a wavelength of 700 nm. In this manner, it is difficult for an optical element having a configuration deviating from the various numerical limitations in the embodiments to have excellent anti-reflection performance. In particular, if the thickness of the third layer 6 is thinner than 200 nm, the reflectance characteristics are remarkably deteriorated at a long wavelength range or at a large incident angle, and thus, an optical element having excellent wavelength band characteristics and excellent incident angle characteristics is difficult to be realized.

Third Comparative Example

Figure 14A:
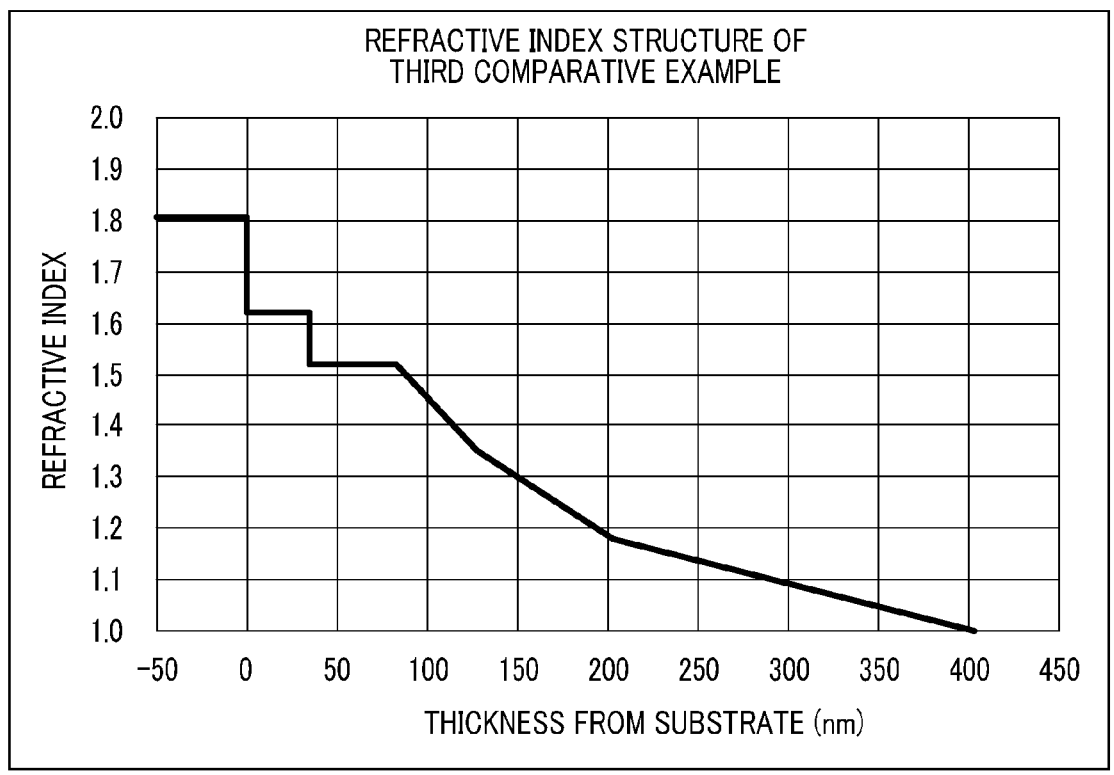
FIGS. 14A and 14B are graphs illustrating the structure and characteristics of an optical element according to a third comparative example.
Figure 14B:
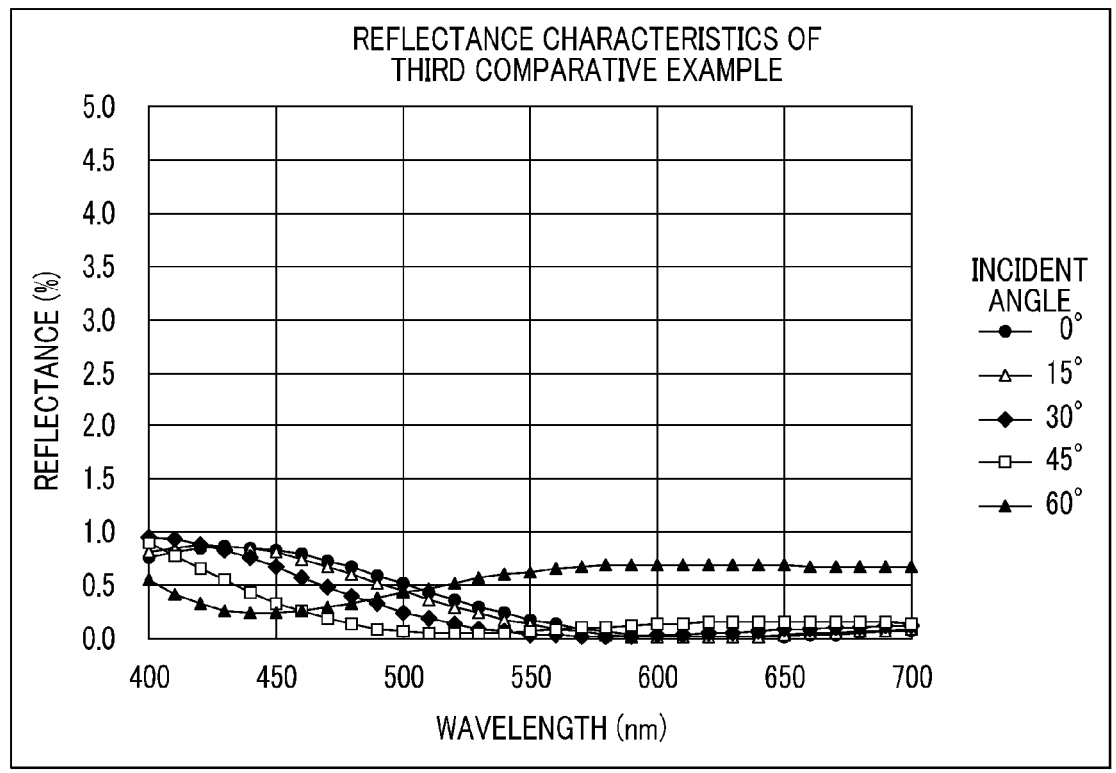

Furthermore, as a reference, a description will be given as a reference for an optical element of a second comparative example with respect to the optical element 1 of the aforementioned embodiments. As in the second comparative example, in the third comparative example, a comparison is also made between the optical element 1 of the embodiments and an optical element having a configuration deviating from the various numerical limitations in the embodiments. FIGS. 14A and 14B are graphs illustrating the structure and characteristics of an optical element according to a third comparative example. In particular, FIG. 14A is a graph specifically illustrating the refractive index structure of the optical element 1 corresponding to FIG. 2. Also, the components of the optical element of the present embodiment are designated by the same reference numerals as those of the optical element 1 of the first embodiment. As in the first embodiment (second comparative example), in the present comparative example, a glass material having a refractive index of 1.808 (S-LAH 65 manufactured by OHARA INC.) is employed as the substrate 2. Among the layers constituting the anti-reflection film 3, the first layer 4 is a film having a thickness of 35 nm and a refractive index of 1.620 and the second layer 5 is a film having a thickness of 48 nm and a refractive index of 1.52. Furthermore, the third layer 6 has a concave-convex structure having a thickness of 320 nm and a refractive index continuously changing from 1.52 to 1.0. As in the first embodiment, the third layer 6 also has three regions from the first region to the third region. In this case, the first region has a thickness of 45 nm and a refractive index continuously changing at a rate of $3.78 \times 10^{-3}$ nm$^{-1}$, the second region has a thickness of 75 nm and a refractive index continuously changing at a rate of $2.27 \times 10^{-3}$ nm$^{-1}$, and the third region has a thickness of 148 nm and a refractive index continuously changing at a rate of $0.90 \times 10^{-3}$ nm$^{-1}$.

FIG. 14B is a graph illustrating the reflectance characteristics of the anti-reflection film 3 in this case corresponding to FIG. 3B. As shown in FIG. 14B, in particular, the reflectance of the anti-reflection film 3 at the incident angle of 60 degrees is 1.0% or less across the entire visible wavelength region, and thus, the optical element exhibits excellent anti-reflection performance. However, the reflectance characteristics are deteriorated across a short wavelength range when the incident angle is in the range of from 0 degrees to 45 degrees. In particular, when the incident angle is 0 degrees, the reflectance reaches closer to 1.0% at a wavelength of 400 nm. In other words, it is difficult even for such an optical element to exhibit excellent anti-reflection performance. In particular, if the thickness of the third layer 6 is greater than 300 nm, the reflectance characteristics are remarkably deteriorated at a short wavelength range. Furthermore, if the thickness of the third layer 6 is greater than 300 nm, it is highly likely that, after being formed by a wet process, a crack will be produced in the third layer 6 upon drying.

As described above, various numerical values obtained for each of the refractive index structures according to the first to fifth embodiments and the second and third comparative examples are summarized in the table shown in FIG. 15.

(Optical System and Optical Apparatus)

Next, a description will be given of an optical system and an optical apparatus according to one embodiment of the present invention. The optical system of the present embodiment includes, for example, an imaging optical system which is constructed inside a lens section or a lens barrel provided in the optical apparatus such as a digital camera, a video camera, or the like, and the optical element 1 described in the embodiments may be employed as part of the imaging optical system.

Figure 16:
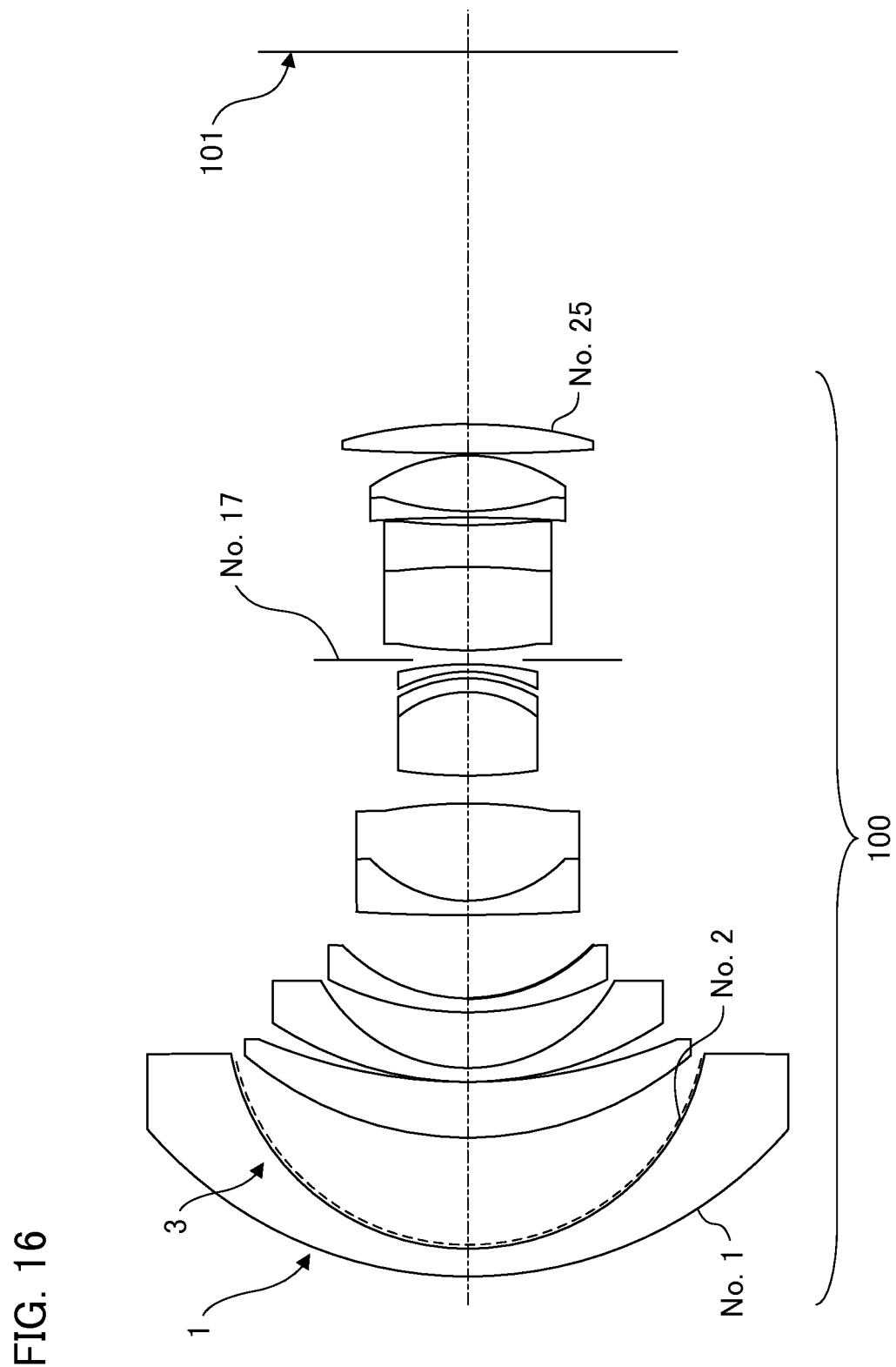
FIG. 16 is a cross sectional view illustrating the configuration of an optical system according to one embodiment of the present invention.

FIG. 16 is a cross-sectional view illustrating the configuration of the essential parts of an optical system 100 according to one embodiment of the present invention. The optical system 100 is a wide field angle lens for a camera having a focal length of 14 mm (f=14.3), where a field angle co is 56.5° and F No. is 2.89. Also, Table 1 shows lens design values for the optical system 100. In Table 1, a unique surface number No. is assigned to each of optical surfaces ranging from a subject image through which a subject image enters, which is located on the leftmost side of the optical system 100, to an imaging surface (imaging element or a film 101). For each surface number No., a radius of curvature "r" (mm), a thickness "d" (mm) between lens surfaces, and a refractive index "n" and Abbe number "v" at the wavelength of 550 nm are shown. In the optical system 100, the optical element 1 according to the embodiments is arranged as an optical element located on the input side of a subject image, and the anti-reflection film 3 is formed on the image side (No. 2) of the optical element 1. In this manner, the anti-reflection film 3 as described in the embodiments is formed on the surface numbered as No. 2, and thus, the surface numbered as No. 2 can have high anti-reflection performance from the central part to the peripheral part thereof despite the fact that the surface numbered as No. 2 has a large curvature (opening angle). Therefore, the optical system 100 of the present embodiment can provide high quality and high definition images while suppressing the occurrence of unnecessary light such as flare or ghost. Note that the optical system 100 described in the present embodiment is merely an example. For example, the optical element 1 of the embodiments may also be employed as an observation optical system such as a telescopic lens having a long focal length, a binocular, or the like. Furthermore, the optical apparatus can provide high quality and high definition still images or moving images by employing such an optical system 100 while suppressing the occurrence of unnecessary light such as flare or ghost.

TABLE 1

| No. | r (mm) | d (mm) | n | v |
|---|---|---|---|---|
| 1 | 43.611 | 3.10 | 1.69680 | 55.5 |
| 2 | 26.108 | 11.30 | | |
| 3 | 58.696 | 5.83 | 1.60311 | 60.7 |
| 4 | 52.318 | 0.15 | | |
| 5 | 36.653 | 1.70 | 1.69680 | 55.5 |
| 6 | 17.777 | 6.39 | | |
| 7 | 48.633 | 1.30 | 1.77250 | 49.6 |
| 8 | 20.569 | 8.24 | | |

TABLE 1-continued

| No. | r (mm) | d (mm) | n | ν |
|---|---|---|---|---|
| 9 | 260.012 | 1.50 | 1.69680 | 55.5 |
| 10 | 15.580 | 10.11 | 1.59551 | 39.2 |
| 11 | −50.458 | 3.24 | | |
| 12 | 54.936 | 8.21 | 1.56732 | 42.8 |
| 13 | −10.586 | 1.50 | 1.77250 | 49.6 |
| 14 | 14.355 | 0.82 | | |
| 15 | −14.991 | 0.90 | 1.77250 | 49.6 |
| 16 | −42.782 | 0.50 | | |
| 17 | (Aperture) | 1.40 | — | — |
| 18 | 84.663 | 8.63 | 1.60311 | 60.7 |
| 19 | −69.334 | 4.00 | 1.74320 | 49.3 |
| 20 | 78.755 | 0.67 | | |
| 21 | −180.599 | 0.80 | 1.92286 | 21.3 |
| 22 | 32.151 | 5.88 | 1.48749 | 70.2 |
| 23 | −18.364 | 0.15 | | |
| 24 | 352.989 | 3.30 | 1.80400 | 46.6 |
| 25 | −38.634 | — | | |

Having described preferred embodiments of the present invention, it is to be appreciated that the present invention is not limited to these embodiments described above but may be embodied with various changes and modifications without departing from the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-163287 filed on Jul. 26, 2011, and Japanese Patent Application No. 2012-122939 filed on May 30, 2012, which are hereby incorporated by reference herein in their entirety.

What is claimed is:

1. An optical element having an anti-reflection film formed on a substrate, wherein the anti-reflection film comprises:
   a first layer formed on the substrate;
   a second layer formed on the first layer and consisting of a material different from that of the first layer; and
   a third layer formed on the second layer and consisting of a concave-convex structure,
   wherein, when a wavelength defining a refractive index is 550 nm, the substrate has a refractive index in the range of from 1.65 to 2.20, the first layer has a thickness in the range of from 30 to 70 nm and a refractive index in the range of from 1.52 to 1.82, the second layer has a thickness in the range of from 10 to 50 nm and a refractive index in the range of from 1.40 to 1.58, and the third layer has a thickness in the range of from 200 to 300 nm and the refractive index of the third layer changes from a value in the range of from 1.40 to 1.58 toward 1.0, and
   wherein the third layer comprises, in order from the second layer:
   a first region that has a thickness in the range of from 15 to 45 nm and a refractive index changing at a rate in the range of from 4.4 to $12 \times 10^{-3}$ nm$^{-1}$;
   a second region that has a thickness in the range of from 25 to 75 nm and a refractive index changing at a rate in the range of from 1.9 to $4.3 \times 10^{-3}$ nm$^{-1}$; and
   a third region that has a thickness in the range of from 120 to 200 nm and a refractive index changing at a rate in the range of from 0.9 to $1.8 \times 10^{-3}$ nm$^{-1}$.

2. The optical element according to claim 1, wherein the first layer, the second layer, and the third layer are formed by a wet process.

3. The optical element according to claim 1, wherein the first layer is an organic resin layer.

4. The optical element according to claim 1, wherein the second layer is a porous layer whose principal component is aluminum oxide.

5. The optical element according to claim 1, wherein the third layer is formed of a plate-like crystal whose principal component is aluminum oxide.

6. An optical system having at least two or more optical elements, wherein at least one of the optical elements is the optical element according to claim 1.

7. An optical apparatus having an optical system, wherein the optical system is the optical system according to claim 6.

* * * * *